United States Patent
Choi et al.

(10) Patent No.: US 9,042,303 B2
(45) Date of Patent: May 26, 2015

(54) SMART ANTENNA SOFTWARE DEFINITION RADIO TERMINAL DEVICE AND METHOD OF DISTRIBUTING AND INSTALLING SOFTWARE DEFINITION RADIO TERMINAL APPLICATION

(75) Inventors: Seung Won Choi, Seoul (KR); June Kim, Incheon (KR); Chi Young Ahn, Bucheon-si (KR); Hyun Wook Yang, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 255 days.

(21) Appl. No.: 13/822,423

(22) PCT Filed: Oct. 6, 2011

(86) PCT No.: PCT/KR2011/007424
§ 371 (c)(1),
(2), (4) Date: May 10, 2013

(87) PCT Pub. No.: WO2012/047050
PCT Pub. Date: Apr. 12, 2012

(65) Prior Publication Data
US 2013/0235798 A1    Sep. 12, 2013

(30) Foreign Application Priority Data

| | | |
|---|---|---|
| Oct. 6, 2010 | (KR) | 10-2010-0097495 |
| Dec. 24, 2010 | (KR) | 10-2010-0135001 |
| Dec. 24, 2010 | (KR) | 10-2010-0135002 |
| May 9, 2011 | (KR) | 10-2011-0043646 |
| May 9, 2011 | (KR) | 10-2011-0043680 |
| May 9, 2011 | (KR) | 10-2011-0043683 |

(51) Int. Cl.
*H04B 1/00* (2006.01)
*H04L 29/08* (2006.01)
(Continued)

(52) U.S. Cl.
CPC ............. *H04B 1/0003* (2013.01); *H04W 88/02* (2013.01); *H04L 67/34* (2013.01); *H04W 4/001* (2013.01)

(58) Field of Classification Search
CPC ............ G06F 17/5045; G06F 17/5054; H04B 1/0003; H04L 27/2096; H04W 88/06
See application file for complete search history.

(56) References Cited

U.S. PATENT DOCUMENTS 7,302,269 B1    11/2007   Crawford et al.
7,404,074 B2 *   7/2008   Murotake ..................... 713/100
(Continued)

FOREIGN PATENT DOCUMENTS

KR       1020090063830 A    6/2009
KR         20100092940 A    8/2010

OTHER PUBLICATIONS

Namkyu Ryu, et al; "Smart Antenna Base Station Open Architecture for SDR Networks", IEEE Wireless Communications, Jun. 2006, vol. 13, Issue 3, pp. 58-69. See section "Requirements and Logic Functionalities of SA API" (p. 59).

(Continued)

*Primary Examiner* — Yong Zhou
(74) *Attorney, Agent, or Firm* — Ladas & Parry LLP

(57) ABSTRACT

Disclosed is a smart antenna software definition radio terminal device. A software definition radio terminal device in a smart antenna software definition radio multi antenna system according to the present invention includes: a storage unit, a microprocessor, and at least one baseband accelerator. The microprocessor is configured to select a smart antenna algorithm; receive a control command from a radio controller layer for delivering a control command to control the baseband accelerator and a radio controller layer on the basis of the selected algorithm; read from the storage unit a code including a baseband driver layer that delivers the received control command to the baseband accelerator, and execute the read code; and load at least one functional block for realizing at least one smart antenna algorithm from the storage unit into the baseband accelerator. According to the terminal device, a terminal having a modem chip of a different structure may execute the same radio application through standard API.

19 Claims, 19 Drawing Sheets

(51) Int. Cl.
*H04W 4/00* (2009.01)
*H04W 88/02* (2009.01)

(56) References Cited

U.S. PATENT DOCUMENTS

| | | | |
|---|---|---|---|
| 8,019,285 B2 | 9/2011 | Nakamura | |
| 2005/0059427 A1* | 3/2005 | Wallace | 455/552.1 |
| 2006/0176077 A1 | 8/2006 | Grabill et al. | |
| 2008/0085727 A1* | 4/2008 | Kratz | 455/456.5 |
| 2008/0174488 A1 | 7/2008 | Weinstein et al. | |
| 2009/0161645 A1* | 6/2009 | Wang et al. | 370/342 |
| 2010/0246727 A1* | 9/2010 | Hyeon et al. | 375/340 |

OTHER PUBLICATIONS

Object Management Group; PIM and PSM for Smart Antenna Specification Version 1.0, (Standard document URL: http://www.omg.org/spec/smartant/1.0) Jan. 1, 2009, 40 pages See section 8 "Platform Independent Model (PIM)".

Eltawwil Ahmed et al; "Universal MIMO-OFDM SDR for Mobile Autonomous Networks", Nov. 24, 2004, http://handle.dtic.mil/100.2/ADA429035 See I. introduction; Figs 1,2.

David Palchak et al; "A Software Defined Radio Testbed for Mimo Systems", 2006 SDR Forum, Dec. 31, 2006, www.sdrforum.org/pages/sdr06/sdr06_papers/1.1/1.1-5.pdf See abstract, 2.SDR Platform.

Amit Gupta, et al; "Rapid MIMO-OFDM Software Defined Radio System Prototyping", 2004 IEEE, Dec. 31, 2004, http://ieeexplore.ieee.org/xpl/freeabs_all.jsp?arnumber=1363046 See abstract; I.introduction.

Seungheon Hyun, et al; "Standardizing smart antenna API for SDR networks", www.rfdesign.com, Sep. 2007, 4 pages.

USPTO NFOA mailed Sep. 6, 2012 in connection with U.S. Appl. No. 12/744,610.

ISR mailed Oct. 26, 2011, Appln. PCT/KR2010/009298.

ISR mailed May 7, 2012, Appln. PCT/KR2011/007424.

ISR mailed Jun. 29, 2009, Appln. PCT/KR2008/007071.

* cited by examiner

① DIGITAL BASEBAND SIGNAL  ⑥ DEMODULATED PILOT SIGNAL
② CALIBRATED SIGNAL  ⑦ CHANNEL COEFFICIENT
③ SYNCHRONIZED SIGNAL  ⑧ CHANNEL STATE INFORMATION (CSI)
④ TRAFFIC SIGNAL  ⑨ CALIBRATION PATTERN
⑤ SM-DECODED SIGNAL

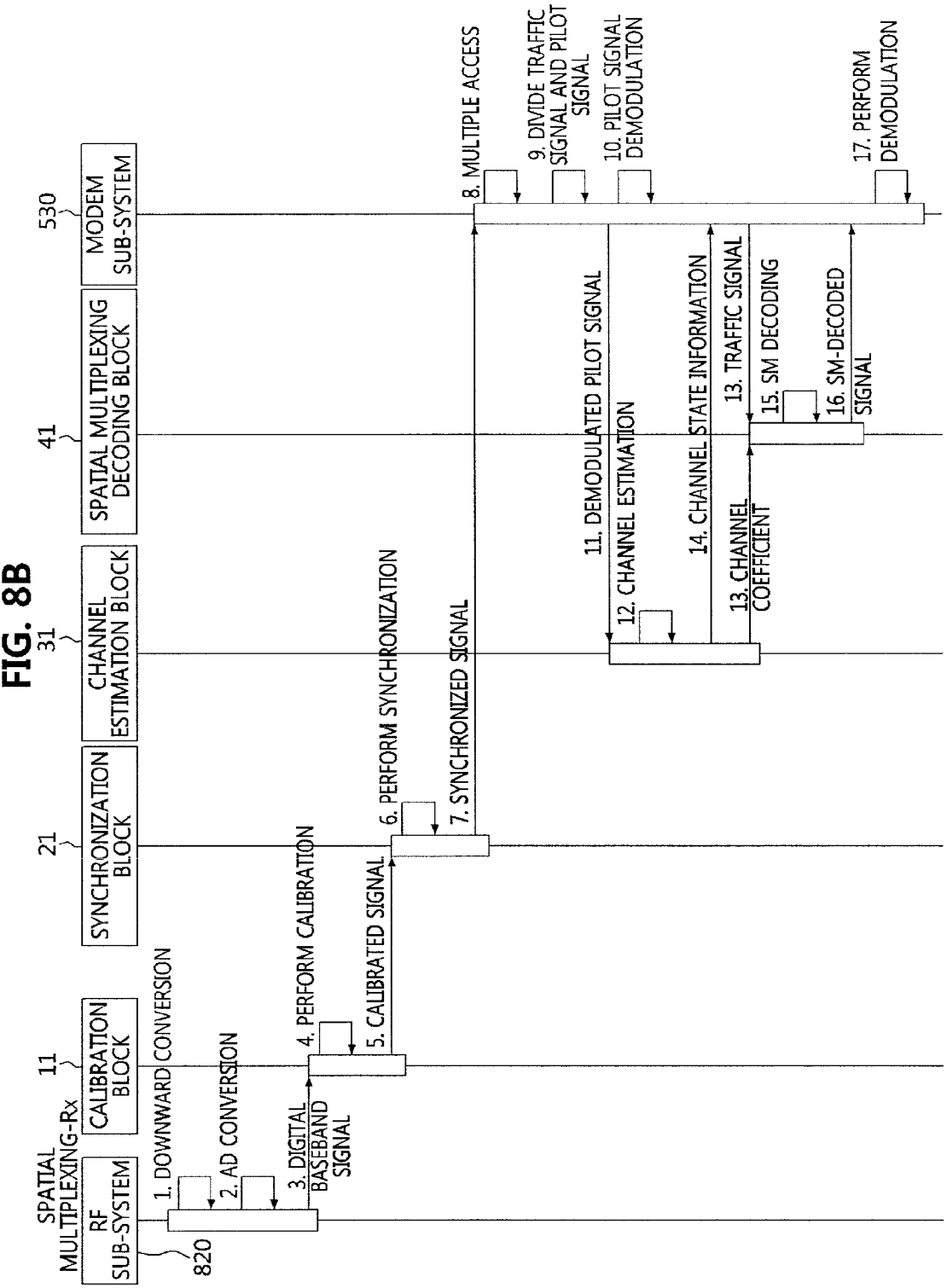

① DIGITAL BASEBAND SIGNAL
② CALIBRATED SIGNAL
③ SYNCHRONIZED SIGNAL
④ TRAFFIC SIGNAL
⑤ DEMODULATED PILOT SIGNAL
⑥ BEAMFORMED PILOT SIGNAL
⑦ BEAMFORMED TRAFFIC SIGNAL
⑧ CHANNEL-COMPENSATED SIGNAL
⑨ CALIBRATION PATTERN
⑩ CHANNEL STATE INFORMATION (CSI)

SMART ANTENNA SOFTWARE DEFINITION RADIO TERMINAL DEVICE AND METHOD OF DISTRIBUTING AND INSTALLING SOFTWARE DEFINITION RADIO TERMINAL APPLICATION

TECHNICAL FIELD

Example embodiments of the present invention relate in general to a software-defined radio (SDR) terminal device of an SDR multiple antenna system for supporting multiple antenna technology and a method for distributing and installing SDR terminal applications and more specifically to an SDR terminal device of an SDR multiple antenna system capable of performing various smart antenna algorithms and a method for distributing and installing SDR terminal applications.

BACKGROUND ART

With the development of communication technology, various new radio applications are used depending on preferences or purposes of users. Most radio applications such as LTE, WCDMA, WIMAX, and GSM are executed on a terminal in association with a modem.

To enable such applications to control modems, unique commands of the modems according to modem manufacturers or models should be understood and modules compatible with the commands should be developed. Accordingly, some radio applications are only executed in specific modems or modems of specific manufacturers. To overcome this limitation, all of different commands for various modems are included in an application or different execution files for different modems are produced and distributed.

However, according to such methods, applications should be optimized for each piece of hardware of various commercial modems, and thus it is almost impossible to produce a radio application compatible with all terminals. Moreover, it requires a great amount of human resources to produce a single radio application.

Recently, with the rapid development of wireless communication technology, various communication protocols have been defined. Accordingly, the demand for devices supporting the protocols increases. Radio implementation devices depend on specific hardware such as amplifiers, antennas, and filters to support each protocol, and thus require additional hardware to support new protocols.

Therefore, software-defined radio (SDR) technology for supporting various communication protocols in a single-hardware platform is receiving great attention. The SDR technology aims for openness, interoperability, and portability of a wireless communication system so that the communication system can be compatible with various communication protocols and communication technologies without hardware modification or upgrade.

A conventional single antenna system roughly consists of a modem sub-system and an RF/IF sub-system without considering multiple antennas. Therefore, the conventional single antenna system cannot efficiently adapt to a current rapidly changing communication environment.

A multiple antenna system is receiving great attention since a channel capacity can be increased in proportion to the number of antennas without allocation of additional frequencies or transmission power. In particular, according to multiple-input and multiple-output (MIMO) technology, multiple antennas are used at both transmission and reception sides to increase a channel capacity within limited frequency resources, thereby increasing a data transmission rate. That is, this MIMO technology may remarkably improve data processing capability and a link range without additional bandwidths or transmission power.

However, the multiple antenna system does not have a structure that can be obtained by simply adopting a plurality of single antenna systems supported by an existing SDR system. To support the multiple antenna system, multiple antenna algorithms such as a spatial multiplexing (SM) algorithm, a beamforming algorithm, a space-time coding (STC) algorithm, and a direction of arrival (DOA) estimating algorithm should be provided, and a synchronization issue for the multiple antenna system should be addressed.

According to an SM technique, a virtual sub-channel is established between transmitting and receiving antennas and different data is transmitted through respective transmitting antennas to thereby increase a transmission rate. That is, the SM technique increases a transmission rate using spatial diversity, and is thus suitable for a communication environment in which a fast transmission rate is required.

A beamforming technique is used to allow energy from an antenna to intensively radiate in a specific direction so that a signal is received or transmitted in a desired direction. According to this technique, strength of a signal is adjusted according to position angles of a base station and a mobile station by controlling phase information for each antenna so as to release adjacent interference, thereby improving performance.

An STC technique allows use of a multiple antenna in a wireless communication system so as to improve reliability of data transmission. According to the STC technique, a plurality of overlapping data streams are transmitted so that at least a few of the overlapping data streams are received in a reliable state even when data loss occurs during data transmitting and receiving processes. Thus, the STC technique is suitable for a communication environment in which data reliability is important.

A DOA estimating technique is used to select an antenna beam for transmitting a signal in a desired direction or control an antenna beam of a direction in which a desired signal is received. A beam former estimates steering vectors and DOA for multiple simultaneously detected spatial signals, and determines beamforming weight vectors on the basis of a combination of the steering vectors.

To apply the above-mentioned techniques for multiple antennas to an SDR system, a structure of the SDR system should provide openness, dispersibility, object orientation, and software reusability. An SDR multiple antenna system that satisfies these conditions needs to provide an architecture of a smart antenna sub-system that can be applied to a standard SDR system so as to provide reusability, connectivity, and extendibility.

DISCLOSURE

Technical Problem

Example embodiments of the present invention provide a software-defined radio (SDR) terminal device for an SDR multiple antenna system for performing a radio application without depending on a modem chip and supporting various smart antenna algorithms.

Example embodiments of the present invention provide a method for distributing an SDR terminal application for an SDR multiple antenna system for performing a radio application without depending on a modem chip and supporting various smart antenna algorithms.

Example embodiments of the present invention provide a method for installing an SDR terminal application for an SDR multiple antenna system for performing a radio application without depending on a modern chip and supporting various smart antenna algorithms.

Technical Solution

In some example embodiments, a software-defined radio (SDR) terminal device of a smart antenna SDR multiple antenna system includes a storage unit, a microprocessor, and at least one baseband accelerator, wherein the microprocessor is configured to read a code from the storage unit, execute the code, and load at least one function block for implementing at least one smart antenna algorithm from the storage unit to the baseband accelerator, the code including: a radio control layer configured to transfer a control command for selecting a smart antenna algorithm and controlling the baseband accelerator according to the selected algorithm; and a baseband driver layer configured to receive the control command from the radio controller layer and transfer the received control command to the baseband accelerator, wherein the function block includes blocks for implementing a spatial multiplexing signal processing algorithm, blocks for implementing a beamforming signal processing algorithm, blocks for implementing a space-time coding signal processing algorithm, blocks for implementing a direction of arrival estimating algorithm, and a control block for controlling operations and interfaces of the function blocks according to the smart antenna algorithm selected in the radio controller layer.

In other example embodiments, a method for distributing a software-defined radio (SDR) application of a smart antenna SDR multiple antenna system includes: generating an application package including: a user-defined code for defining function blocks for implementing at least one smart antenna algorithm; a radio controller code for controlling the function blocks for implementing the at least one smart antenna algorithm and interfacing with an operating system of a terminal; and pipeline configuration metadata which define an interconnection between the function blocks for implementing the at least one smart-antenna algorithm and initial values of attributes of the function blocks; and uploading the generated application package to an SDR terminal application distribution server, wherein the function blocks include blocks for implementing a spatial multiplexing signal processing algorithm, blocks for implementing a beamforming signal processing algorithm, blocks for implementing a space-time coding signal processing algorithm, blocks for implementing a direction of arrival estimation algorithm, and a control block for receiving a control command for the function blocks and controlling the function blocks.

In still other example embodiments, a method for installing a software-defined radio (SDR) terminal application of a smart antenna SDR multiple antenna system includes: downloading, from an SDR terminal application distribution server, an application package including: a user-defined code for defining function blocks for implementing at least one smart antenna algorithm; a radio controller code for controlling the function blocks for implementing the at least one smart antenna algorithm and interfacing with an operating system of a terminal; and pipeline configuration metadata which define an interconnection between the function blocks for implementing the at least one smart-antenna algorithm and initial values of attributes of the function blocks; and storing the radio controller code and the user-defined code in a storage unit of the terminal with reference to the pipeline configuration metadata, wherein the function blocks include blocks for implementing a spatial multiplexing signal processing algorithm, blocks for implementing a beamforming signal processing algorithm, blocks for implementing a space-time coding signal processing algorithm, blocks for implementing a direction of arrival estimation algorithm, and a control block for receiving a control command for the function blocks and controlling the function blocks.

Advantageous Effects

Using an SDR terminal device of an SDR multiple antenna system for a smart antenna algorithm according to the present invention, the same radio application can be executed in terminals having differently structured modem chips using a standard API. Further, by allowing various signals transmitted and received through multiple antennas to be processed by reconfigurable elements to which various smart antenna algorithms can be applied, terminal devices for a multiple antenna system which do not depend on a communication environment can be implemented.

Using methods of distributing and installing an SDR terminal application of an SDR multiple antenna system for a smart antenna algorithm according to the present invention, the same radio application can be executed in terminals having differently structured modem chips using a standard API. Further, an application that allows various signals transmitted and received through multiple antennas to be processed by reconfigurable elements to which various smart antenna algorithms can be applied is conveniently distributed through a server and is installed in a necessary terminal device. Therefore, SDR terminal applications for a multiple antenna system which do not depend on a communication environment can be supplied and installed in SDR terminal devices at an appropriate time.

DESCRIPTION OF DRAWINGS

FIG. 8B is a sequence chart illustrating a signal flow and process between function blocks for receiving a spatial multiplexing signal in an SDR terminal device of an SDR multiple antenna system for a smart antenna algorithm according to an example embodiment of the present invention;

BEST MODE

Figure 1:
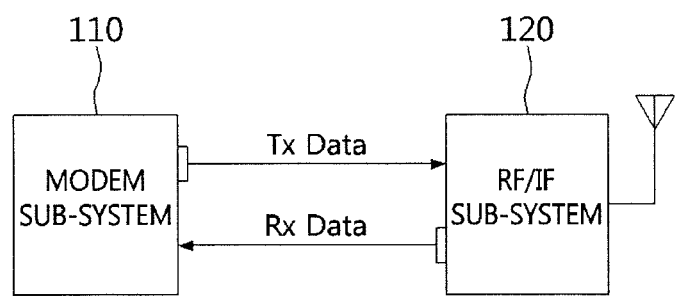
FIG. 1 is a schematic block diagram illustrating an overall configuration of a conventional single-antenna system to which a software-defined radio system is applied.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a block diagram illustrating an overall configuration of a conventional single antenna system to which a software-defined radio (SDR) system is applied.

Referring to FIG. 1, the conventional single antenna system only includes a modem sub-system 110 and an RF/IF sub-system 120 unit without considering multiple antennas.

Conventional terminal devices generally adopt the single antenna system as illustrated in FIG. 1, and most modem chips installed in the terminal devices are designed to be dependent on specific communication standards. Therefore, the present invention relates to a terminal device for overcoming the limitation of dependency on communication standards and a method for installing and distributing an SDR terminal application.

Figure 2:
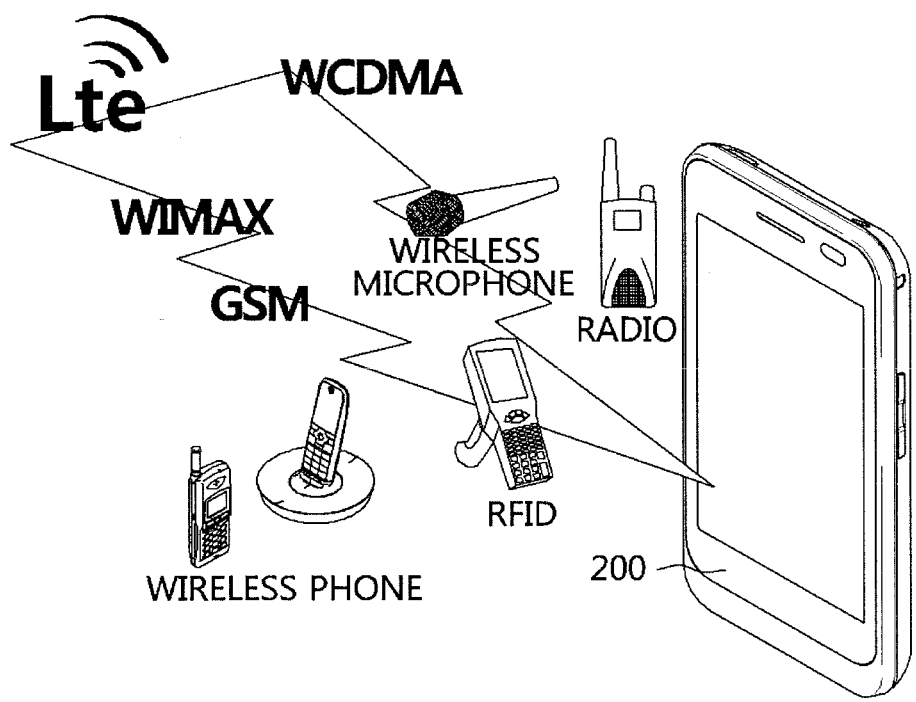
FIG. 2 is a conceptual diagram illustrating a function of an SDR terminal device of an SDR multiple antenna system for a smart antenna algorithm according to an example embodiment of the present invention.

FIG. 2 is a conceptual diagram illustrating a function of an SDR terminal device of an SDR multiple antenna system for a smart antenna algorithm according to an example embodiment of the present invention.

Referring to FIG. 2, an SDR terminal device 200 of an SDR multiple antenna system for a smart antenna algorithm according to an example embodiment of the present invention may select, download and install one of general radio applications including long-term evolution (LTE), wideband code division multiple access (WCDMA), worldwide interoperability for microwave access (WiMAX), global system for mobile communications (GSM), and radio-frequency identification (RFID) which support current smart antenna algorithms or smart antenna algorithms that will be possibly supported later so as to operate in a corresponding communication scheme and provide functions of a radio, a wireless microphone, and a wireless telephone.

Example Embodiment of SDR Terminal Device

Figure 3:
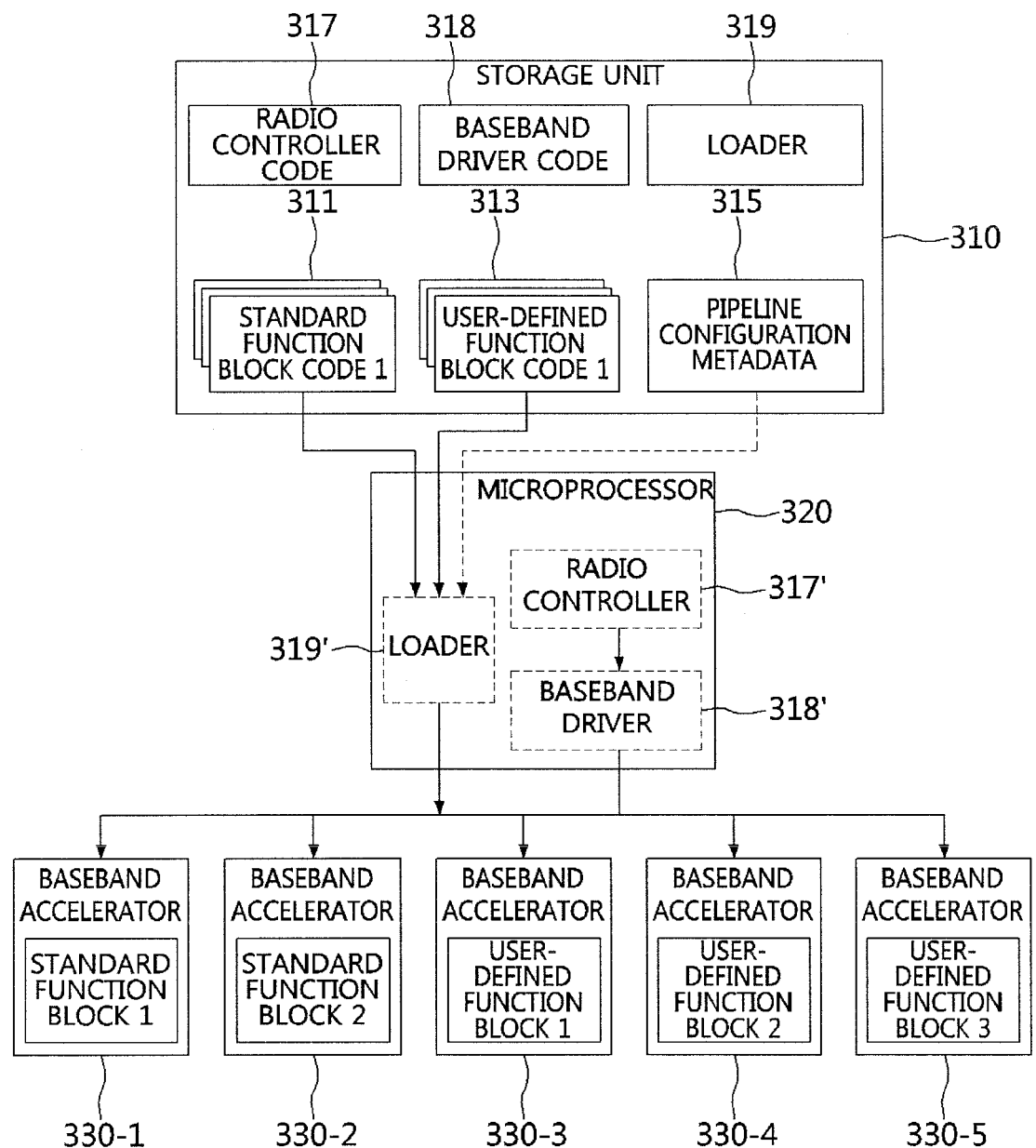
FIG. 3 is a block diagram illustrating a configuration of an SDR terminal device of an SDR multiple antenna system for a smart antenna algorithm according to an example embodiment of the present invention.

FIG. 3 is a block diagram illustrating a configuration of an SDR terminal device of an SDR multiple antenna system for a smart antenna algorithm according to an example embodiment of the present invention.

Referring to FIG. 3, the SDR terminal device according to an example embodiment of the present invention may include: a storage unit 310 for storing a user-defined function block code 313, pipeline configuration metadata 315, a radio controller code 317, a baseband driver code 318, and a loader 319; a microprocessor 320 for reading and executing the controller code 317, the baseband driver code 318, and the loader 319; and a plurality of baseband accelerators 330.

Hereinafter, the configuration and connection relationship of elements of the SDR terminal device according to an example embodiment of the present invention will be described in detail with reference to FIG. 3.

The storage unit 310 may store a standard function block code 311, the user-defined function block code 313, and the pipeline configuration metadata 315.

Here, the storage unit 310 includes a non-volatile (NV) memory such as a flash memory, a DRAM, or an SRAM to store the user-defined function block code 313, the pipeline configuration metadata 315, the radio controller code 317, the baseband driver code 318, and the loader 319. Therefore, the microprocessor 320 is configured to read codes from the storage unit and execute the read codes.

For example, elements (a radio controller layer and a baseband driver layer) to be mapped to a memory space (address space) of the microprocessor 320 and to be executed are read from the non-volatile memory and are loaded on the volatile memory of the storage unit 310 so as to be executed by the microprocessor 320.

However, the non-volatile memory may also be directly mapped to the memory space of the microprocessor 320. In this case, a code in the non-volatile memory may be directly executed by the microprocessor 320.

The standard function block 311 may be a function block for supporting standard signal processing functions (e.g. DFT, IDFT, FFT, IFFT, channel coding, and interleaving) established on the basis of a predefined standard baseband interface. Therefore, the standard function block 311 may be initially installed in a terminal device according to the present invention or may be provided to a user through a firmware or software upgrade.

The user-defined function block 313 may be a function block that is provided from a radio application provider and is installed in the storage unit 310 by a user The pipeline configuration metadata 315 may be a data file that defines connections between function blocks needed to implement a smart antenna algorithm and initial values of attributes of the function blocks.

A radio controller 317' may be a part for allowing the radio control code installed in the storage unit to be read by the microprocessor in order to control function blocks needed to implement a smart antenna algorithm and for an interface between a device and an operating system.

The microprocessor 320 may be configured to select a smart antenna algorithm to be controlled and read, from the storage unit 310, and execute the radio controller code 317 that transfers a control command for controlling the baseband accelerator 330 according to the selected algorithm. Further, the microprocessor 320 may read from the storage unit 310 and execute the code 318 including a baseband driver layer. Here, a baseband driver 318' may be configured to receive a control command from the radio controller 317' and transfer the control command to the baseband accelerator 330. Here, the control command may also be received from a network manager included in an operating system of a device.

The microprocessor 320 may serve to download, to the baseband accelerator, the user-defined function blocks 313 for supporting a plurality of smart antenna algorithms, e.g., a spatial multiplexing signal transmitting/receiving processing algorithm, a beamforming signal transmitting/receiving processing algorithm, a space-time coding signal transmitting/receiving processing algorithm, and a direction of arrival estimating algorithm, in order to reconfigure the baseband accelerator so that the algorithms are executed in a terminal of the present invention.

To this end, as illustrated in FIG. 3, one or more function blocks 311 and 313 may be loaded from the storage unit 310 to the baseband accelerator 330. Here, function blocks needed to perform an algorithm may be arranged in the baseband accelerator 334 through a loader 319' with reference to the pipeline configuration metadata 315. The loader 319' may be a program loaded from the storage unit and executed by the microprocessor. According to implementation examples, the loader 319' may be included in the baseband driver. That is, the loader 319' allows all standard function blocks 311 defined in the pipeline configuration metadata 315 and the user-defined function block 313 to be loaded to the baseband accelerator 330 and executed.

Here, all function blocks related to a plurality of smart antenna algorithms to be performed in a terminal device may be loaded to the baseband accelerator 330, or only a function block related to a smart antenna algorithm selected in the radio controller 317' may be loaded. This may be optionally configured in consideration of performance and efficiency.

A function block operated in the baseband accelerator 330 may include a control block 335 for controlling operations and interfaces of function blocks 331 to 334 loaded to the baseband accelerator 330 and executed according to a smart antenna algorithm selected in the radio controller 317'.

Function blocks related to smart antenna algorithms and methods of operating the function blocks will be described in detail later.

Example Embodiments of Configuration of SDR Terminal Application and Method for Distributing the Application Hereinafter, a configuration of an SDR terminal application for an SDR terminal device according to an example embodiment of the present invention and a process of distributing the application will be described.

Figure 4:
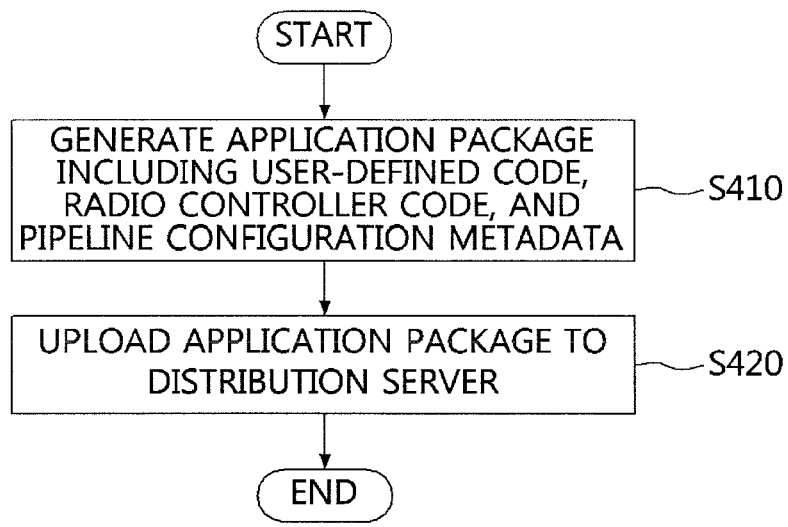
FIG. 4 is a flowchart illustrating a process of distributing an SDR terminal application of an SDR multiple antenna system for a smart antenna algorithm according to an example embodiment of the present invention.

FIG. 4 is a flowchart illustrating a process of distributing an SDR terminal application of an SDR multiple antenna system for a smart antenna algorithm according to an example embodiment of the present invention.

Figure 5:
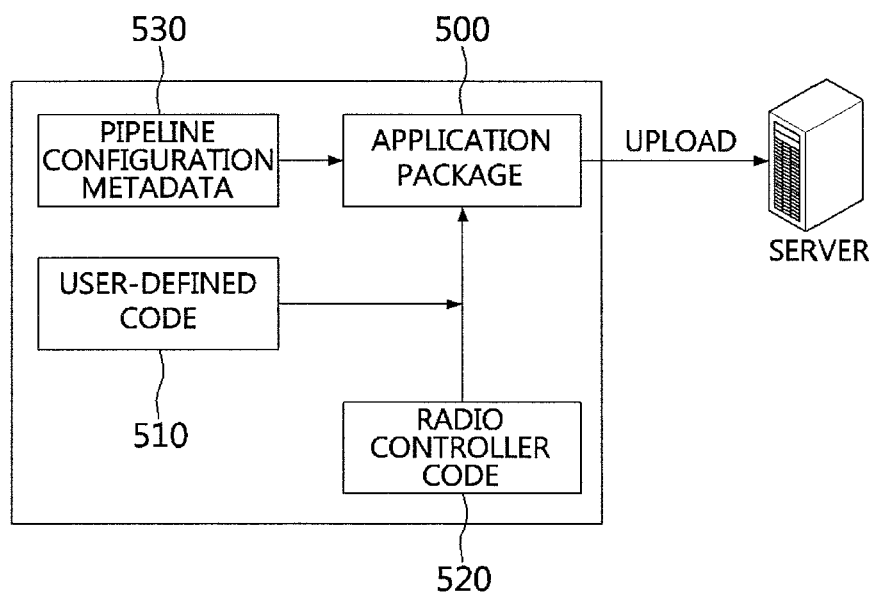
FIG. 5 is a diagram illustrating a configuration of an SDR terminal application of an SDR multiple antenna system for a smart antenna algorithm according to an example embodiment of the present invention.

FIG. 5 is a diagram illustrating a configuration of an SDR terminal application package of an SDR multiple antenna system for a smart antenna algorithm according to an example embodiment of the present invention.

Referring to FIG. 4, a process of distributing an SDR terminal application according to an example embodiment of the present invention may include operation S410 of generating an application package and operation S420 of distributing the application package.

Referring to FIG. 5, an SDR terminal application according to an example embodiment of the present invention is generated in the form of an application package 500 including a user-defined code 510, a radio controller code 520, and a pipeline configuration metadata 530.

Hereinafter, a process of distributing an SDR terminal application according to an example embodiment of the present invention will be described in detail with reference to FIGS. 4 and 5.

In application package generating operation S410, an application to be executed in an SDR terminal is generated. That is, in application package generating operation S410, an application including the user-defined code 510, the radio controller code 520, and the pipeline configuration metadata 530 is generated in the form of the application package 500 as illustrated in FIG. 5.

Here, the user-defined code 510 defines function blocks needed to implement a smart antenna algorithm, and the radio controller code 520 is established to control function blocks needed to implement the smart antenna algorithm.

The user-defined code 510 may be configured in the form of one of a code that is directly executable in the baseband accelerator 330 of a terminal device in which the application package 500 is installed, a source code that needs to be compiled in order to be executed, and intermediate representation (IR).

In the radio controller code 520, a code for controlling function blocks needed to implement a smart antenna algorithm and for an interface between a device and an operation system may be implemented.

Here, as described above, the smart antenna algorithm may include at least one of a spatial multiplexing signal transmitting/receiving processing algorithm, a beamforming signal transmitting/receiving processing algorithm, a space-time coding signal transmitting/receiving processing algorithm, and a direction of arrival estimating algorithm.

The pipeline configuration metadata 530 is a part that defines connections between function blocks needed to implement a selected smart antenna algorithm and initial values of attributes of the function blocks.

The user-defined code 510, the radio controller code 520, and the pipeline configuration metadata 530 are generated in the form of the application package 500 so as to be uploaded to a server and downloaded to and installed in a terminal.

In application package distributing operation S420, the application package 500 is uploaded to an SDR terminal application distributing server so that the application is downloaded to an SDR terminal requiring the application.

Example Embodiment of Method of Installing SDR Terminal Application

Hereinafter, a process of installing an SDR terminal application for an SDR terminal device according to an example embodiment of the present invention will be described.

Figure 6:
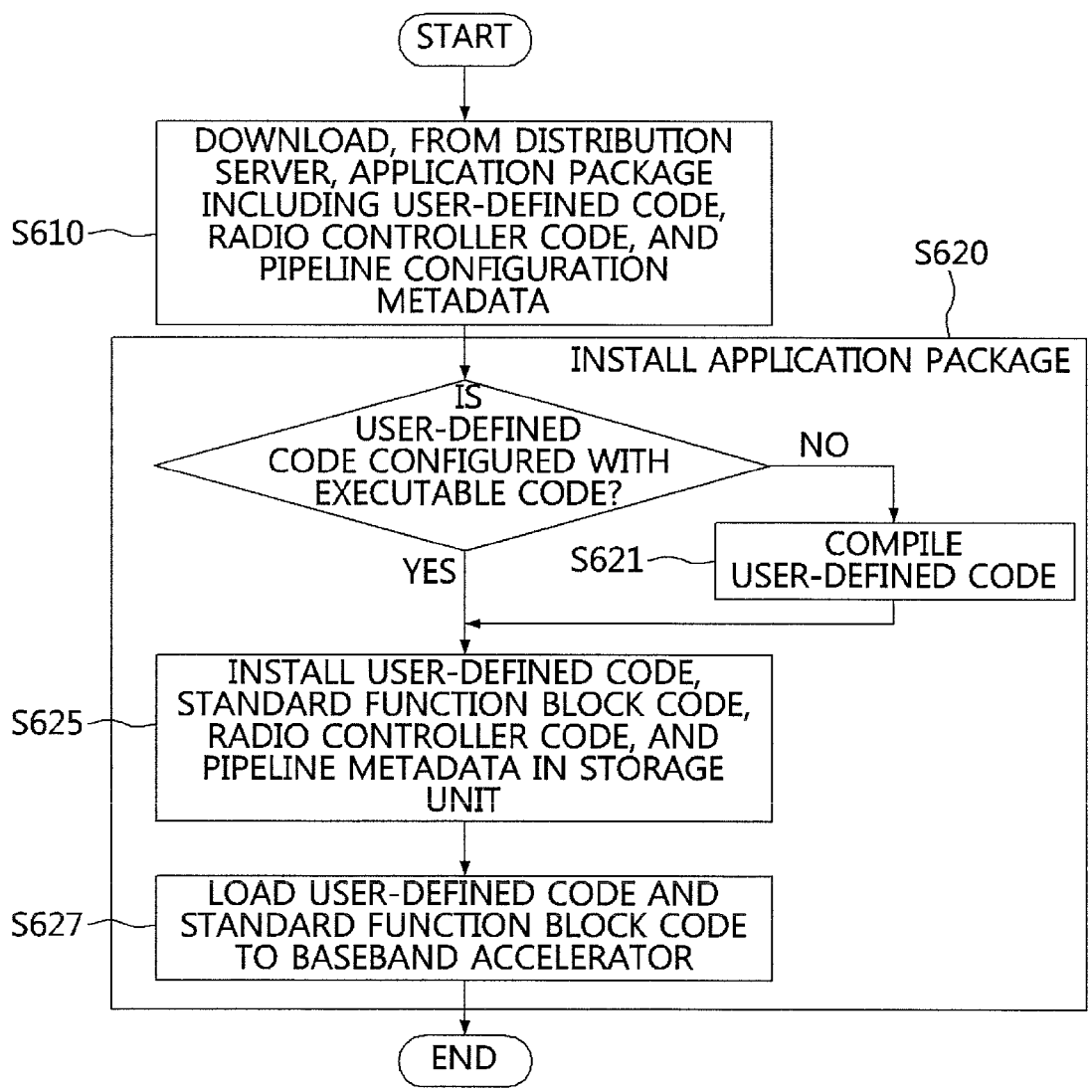
FIG. 6 is a flowchart illustrating a process of installing an SDR terminal application of an SDR multiple antenna system for a smart antenna algorithm according to an example embodiment of the present invention.

FIG. 6 is a flowchart illustrating a process of installing an SDR terminal application of an SDR multiple antenna system for a smart antenna algorithm according to an example embodiment of the present invention.

Referring to FIG. 6, a process of installing an SDR terminal application of an SDR multiple antenna system for a smart antenna algorithm according to an example embodiment of the present invention may include operation S610 of downloading an application package and operation S620 of installing the application package.

Hereinafter, a process of installing an SDR terminal application of an SDR multiple antenna system for a smart antenna algorithm according to an example embodiment of the present invention will be described in detail with reference to FIG. 6.

In application package downloading operation S610, an application to be executed in an SDR terminal is downloaded from a distributing server. That is, in application package downloading operation S610, the application package 500 including the user-defined code 510, the radio controller code 520, and the pipeline configuration metadata 530 as illustrated in FIG. 5 may be downloaded from the distributing server to the SDR terminal.

In application package installing operation S620, the application package downloaded from the distributing server is installed in a format that can be executed in a terminal. Application package installing operation S620 may include operation S621 of compiling a user-defined code, operation S625 of installing the application package in a storage unit, and operation S627 of loading a user-defined function block.

In operation S621 of compiling a user-defined code, when the user-defined code 510 included in the downloaded application package 500 is not directly executable in the baseband accelerator 330 of a terminal, the user-defined code is compiled in a format that can be directly executed in the baseband accelerator of the terminal as described above with reference to FIG. 3 to thereby generate a user-defined function block.

In operation S625 of installing in a storage unit the pipeline configuration metadata 530 included in the downloaded application package 500, a user-defined function block included in the user-defined code 510, the radio controller code 520, and the standard function block 311 in which a standard command established on the basis of a predefined standard baseband interface is specified are installed in a storage unit of the terminal with reference to the pipeline configuration metadata 530.

In operation S627 of loading a user-defined function block, a user-defined function bock included in the user-defined code 510 of the downloaded application package 500 is directly loaded on the baseband accelerator 330. Here, if the user-defined code 510 is established in a format that can be directly executed in the baseband accelerator 330, the user-defined function block included in the user-defined code 510 may be directly loaded on the baseband accelerator 330 without performing operation S621 of compiling a user-defined code.

An SDR terminal device according to an example embodiment of the present invention may perform various smart antenna algorithms by applying a software multiple antenna system. Hereinafter, an operation of an SDR terminal device for an SDR multiple antenna system according to the present invention will be described.

Operation of SDR Terminal Device for SDR Multiple Antenna System

Figure 7:
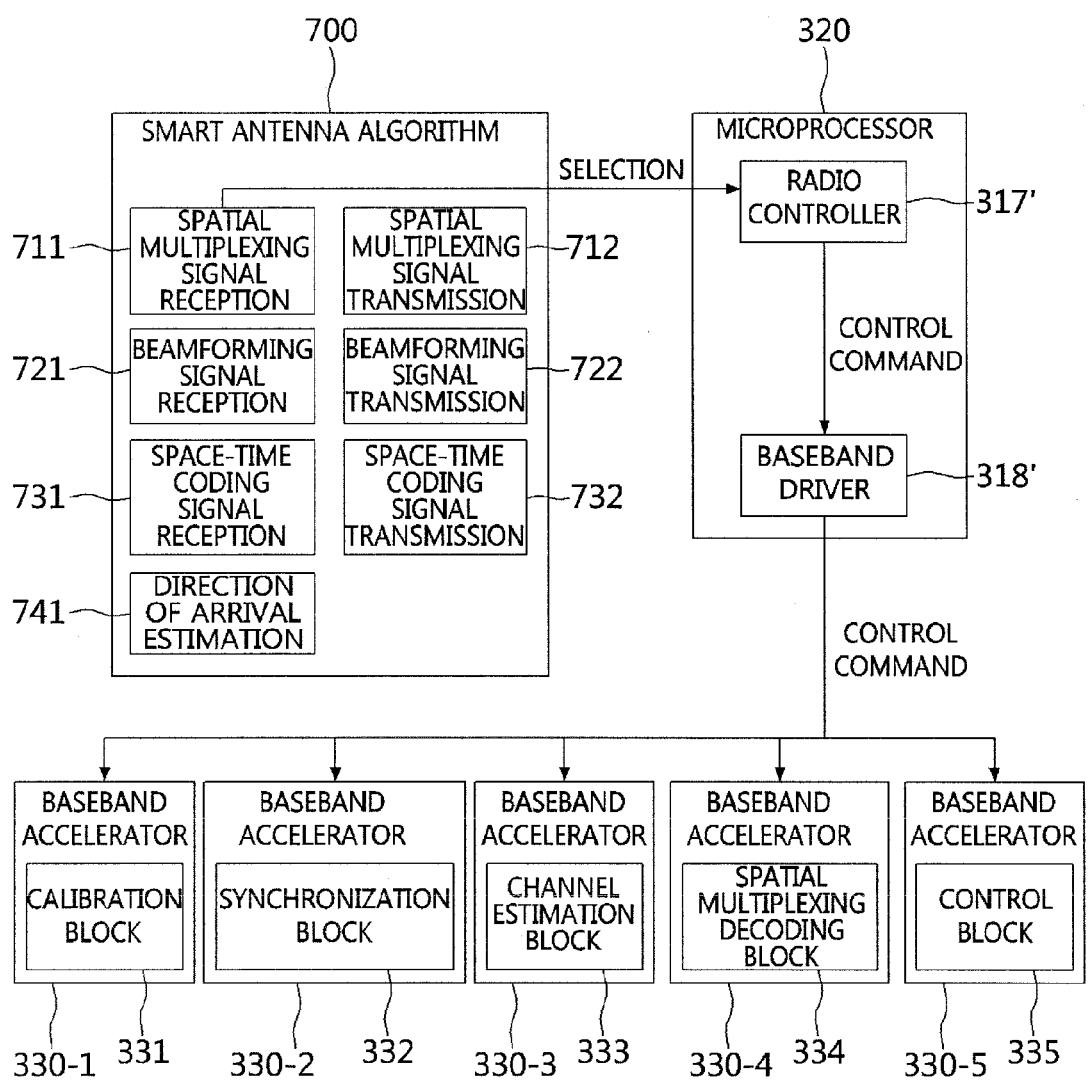
FIG. 7 is a block diagram illustrating an example in which a smart antenna algorithm is selected and controlled in an SDR terminal device of an SDR multiple antenna system for a smart antenna algorithm according to an example embodiment of the present invention.

FIG. 7 is a block diagram illustrating an example in which a smart antenna algorithm is selected and controlled in an SDR terminal device of an SDR multiple antenna system for a smart antenna algorithm according to an example embodiment of the present invention.

Referring to FIG. 7, the radio controller 317' of the terminal device according to an example embodiment of the present invention selects a spatial multiplexing signal receiving algorithm 711 from among smart antenna algorithms 700, and controls the function blocks 331 to 335 needed to perform the selected algorithm.

Referring to FIG. 7, exemplary selectable algorithms are the spatial multiplexing signal receiving algorithm 711, a spatial multiplexing signal transmitting algorithm 712, a beam forming signal receiving algorithm 721, a beam forming signal transmitting algorithm 722, a space-time coding signal receiving algorithm 731, a space-time coding signal transmitting algorithm 732, and a direction of arrival estimating algorithm 741. However, smart antenna algorithms that are executable in a terminal device according to the present invention are not limited thereto.

Hereinafter, an operation of an SDR terminal device of an SDR multiple antenna system according to each smart antenna algorithm will be described.

Figure 8A:
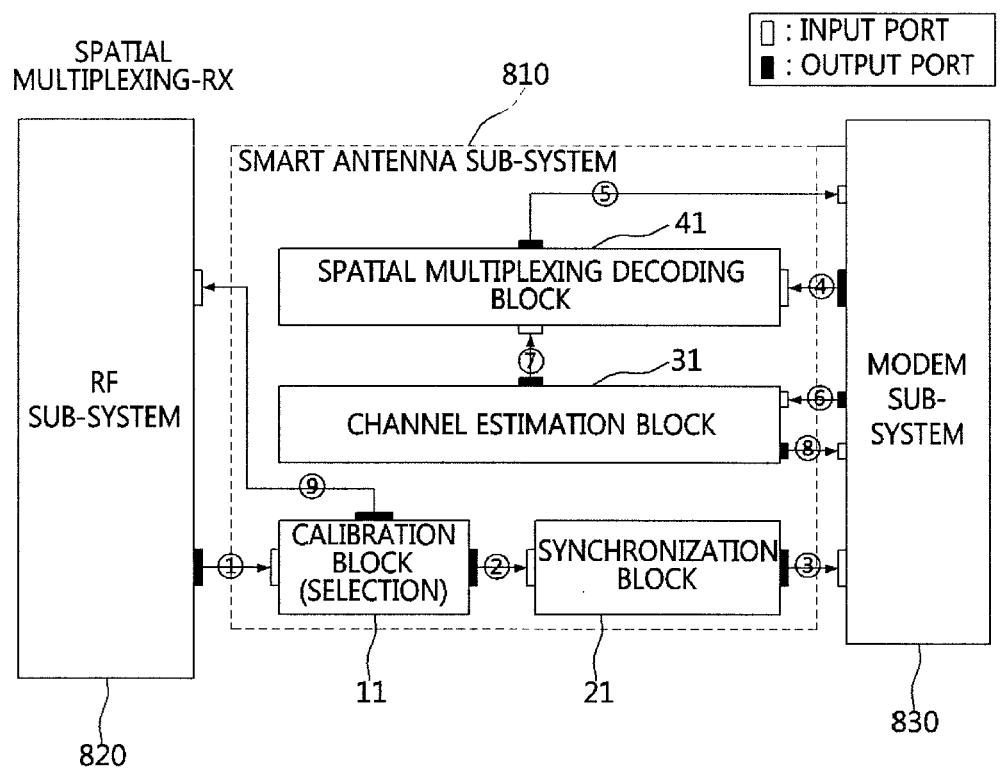
FIG. 8A is a block diagram illustrating function blocks performed to receive a spatial multiplexing signal and a connection relationship between the function blocks in an SDR terminal device of an SDR multiple antenna system for a smart antenna algorithm according to an example embodiment of the present invention.

1) Operation of an SDR Multiple Antenna System for Receiving a Spatial Multiplexing Signal FIG. 8A is a block diagram illustrating function blocks performed to receive a spatial multiplexing signal and a connection relationship between the function blocks in an SDR terminal device of an SDR multiple antenna system for a smart antenna algorithm according to an example embodiment of the present invention.

Referring to FIG. 8A, the function blocks performed in the SDR terminal device of the SDR multiple antenna system for receiving the spatial multiplexing signal may include a calibration block 11, a synchronization block 21, a channel estimation block 31, and a spatial multiplexing decoding block 41.

Referring to FIG. 8A, the SDR multiple antenna system according to an example embodiment of the present invention includes a smart antenna sub-system 810 that is operated in association with an RF sub-system 820 and a modem sub-system 830. Here, the RF sub-system 820 and the modem sub-system 830 operated in association with the smart antenna sub-system 810 may have various configurations without being limited to specific configurations.

Referring to FIG. 8A, a configuration of each function block of the smart antenna sub-system 810 according to an example embodiment of the present invention is described below.

The calibration block 11 compensates for differences of phases and amplitudes caused by differences of characteristics of elements between antenna paths. Characteristics of antenna elements differ according to paths and also differ according to whether transmitting or receiving is performed.

The calibration block 11 has a control port for outputting amplitude and phase differences measured for calibration, determining whether to perform continuous calibrations, setting desired accuracy of calibration, and setting a time needed to perform calibration once, an input data port for receiving a signal to be calibrated, an output data port for providing a calibrated signal, and an input/output data port for transmitting/receiving a calibration pattern for calibration.

For the calibration pattern, a pre-known signal for calibration is wirelessly transmitted to each antenna element, and is received for each antenna path so as to be measured in the calibration block 11 of each path.

Types and operations of ports of the calibration block 11 are described in Table 1 below.

TABLE 1

| Port type | Operation |
| --- | --- |
| Control port (calibration) | Output amplitude/phase differences, determine whether to continuously perform calibration. set desired accuracy or calibration, set time needed for calibration and calibration output value |
| Input data port (DataIn) | Receive a signal to be calibrated |
| Output data port (DataOut) | Output a calibrated signal |
| Input/output data port (TestPattern) | Transmit/receive a calibration pattern for calibration |

The synchronization block 21 serves to synchronize symbols or frames before performing symbol demodulation, frame decoding, and a smart antenna algorithm.

The synchronization block 21 has a control port for determining an observation time of a data sample for synchronization of time and frequency, setting a threshold value for detecting a signal, and reading symbol or frame timing information for synchronization, an input data port for receiving a signal to be synchronized, and an output data port for outputting a synchronized signal.

Types and operations of ports of the synchronization block 21 are described in Table 2 below.

TABLE 2

| Port type | Operation |
| --- | --- |
| Control port (Synchronization) | Determine an observation time of a data sample for synchronization of time and frequency, set a threshold value for detecting a signal, and reading symbol or frame timing information for synchronization |
| Input data port (DataIn) | Receive a signal to be synchronized |
| Output data port (DataOut) | Output a synchronized signal |

The channel estimation block 31 serves to estimate a channel using a pilot signal or compensate for an influence of a channel on a traffic signal.

The channel estimation block 31 has a control port for setting a coherence time of a channel and setting a period for allocation for channel estimation, an input data port for receiving a demodulated pilot signal needed for channel estimation, an output data port for outputting channel state information (CSI) including channel estimation information, and an output data port for outputting estimated channel coefficients.

Here, the channel coefficients represent channel values corresponding to all subcarriers or all symbols estimated using the modulated pilot.

Types and operations of ports of the channel estimation block 31 are described in Table 3 below.

TABLE 3

| Port type | Operation |
|---|---|
| Control port (ChannelEstimation) | Set a coherence time of a channel and set an allocation period for channel estimation |
| Input data port (PilotIn) | Receive a demodulated pilot signal needed for channel estimation |
| Output data port (CSIOut) | Provide channel state information (CSI) including channel estimation information |
| Output data port (ChanCoefficient) | Provide estimated channel coefficients |

The spatial multiplexing decoding block 41 performs spatial multiplexing demodulation in a multiple-input multiple-output (MIMO) environment. According to the spatial multiplexing demodulation, in order to increase throughput, independently and individually encoded signals are received from respective multiple transmitting antennas and are demodulated.

The spatial multiplexing decoding block 41 has a control port for representing a list of available spatial multiplexing schemes, determining a spatial multiplexing algorithm, and representing an index of a codebook predetermined for spatial multiplexing (SM) decoding, an input data port for receiving a traffic signal to be SM-decoded, an output data port for outputting an SM-decoded signal, and an input data port for receiving channel coefficients needed for SM decoding.

Types and operations of ports of the spatial multiplexing decoding block 41 are described in Table 4 below.

TABLE 4

| Port type | Operation |
|---|---|
| Control port (SpatialMultiplexing) | Represent a list of available spatial multiplexing schemes, determine a spatial multiplexing algorithm, and represent an index of a codebook predetermined for SM decoding |
| Input data port (DataIn) | Receive a traffic signal to be SM-decoded |
| Output data port (DataOut) | Provide an SM-decoded signal |
| Input data port (ChanCoeffIn) | Receive channel coefficients needed for SM decoding |

The RF sub-system 820 operated in association with the smart antenna sub-system 810 serves to decrease a signal input in a carrier frequency to a baseband frequency, change an analog signal to a digital signal, and transfer the digital signal to the smart antenna sub-system 810. The modem sub-system 830 serves to extract a signal of a user received from the smart antenna sub-system 810 and demodulate the signal.

FIG. 8A is a block diagram illustrating function blocks performed to receive a spatial multiplexing signal and a connection relationship between the function blocks in an SDR terminal device of an SDR multiple antenna system for a smart antenna algorithm according to an example embodiment of the present invention.

FIG. 8B is a sequence chart illustrating a signal flow and process between function blocks for receiving a spatial multiplexing signal in an SDR terminal device of an SDR multiple antenna system for a smart antenna algorithm according to an example embodiment of the present invention.

Referring to FIGS. 8A and 8B, operations of receiving and processing a spatial multiplexing signal in an SDR terminal device of an SDR multiple antenna system for a smart antenna algorithm according to an example embodiment of the present invention are described below.

A signal input through an antenna is changed to a baseband signal via the RF sub-system 820 and is changed from an analog signal to a digital signal. When it is necessary to compensate for amplitude and phase differences caused by differences of characteristics of elements between antenna paths, for the signal, the calibration block 11 receives a digital baseband signal from the RF sub-system 830 and performs calibration. In this case, the amplitude and phase differences may be measured by transmitting a calibration pattern from the calibration block 11 to the RF sub-system and receiving the calibration pattern.

A calibrated signal, the amplitude and phase differences of which have been compensated for, is transferred to the synchronization block 21 to perform time and frequency synchronization. When calibration is not performed in the calibration block 11, the synchronization block 21 directly receives the digital baseband signal from the RF sub-system 820 to perform synchronization, and the synchronized signal is transferred to the modem sub-system 830.

The synchronized signal is divided into a traffic signal and a demodulated pilot signal via the modem sub-system 830. The traffic signal is transferred to the spatial multiplexing decoding block 41, and the demodulated pilot signal is transferred to the channel estimation block 31. In the channel estimation block 31, channel estimation is performed using the demodulated pilot signal, and a result of the channel estimation, i.e., channel coefficients, are transferred to the spatial multiplexing decoding block 41. Further, if necessary, channel state information (CSI) including receiving channel information is transferred from the channel estimation block 31 to the modem sub-system 530.

The spatial multiplexing decoding block 41 performs SM decoding using the traffic signal received from the modem sub-system 830 and the channel coefficients received from the channel estimation block 31. A result of the SM decoding, i.e., an SM-decoded signal, is transferred to the modem sub-system 830 so that symbol information is demodulated to bit information.

Figure 9A:
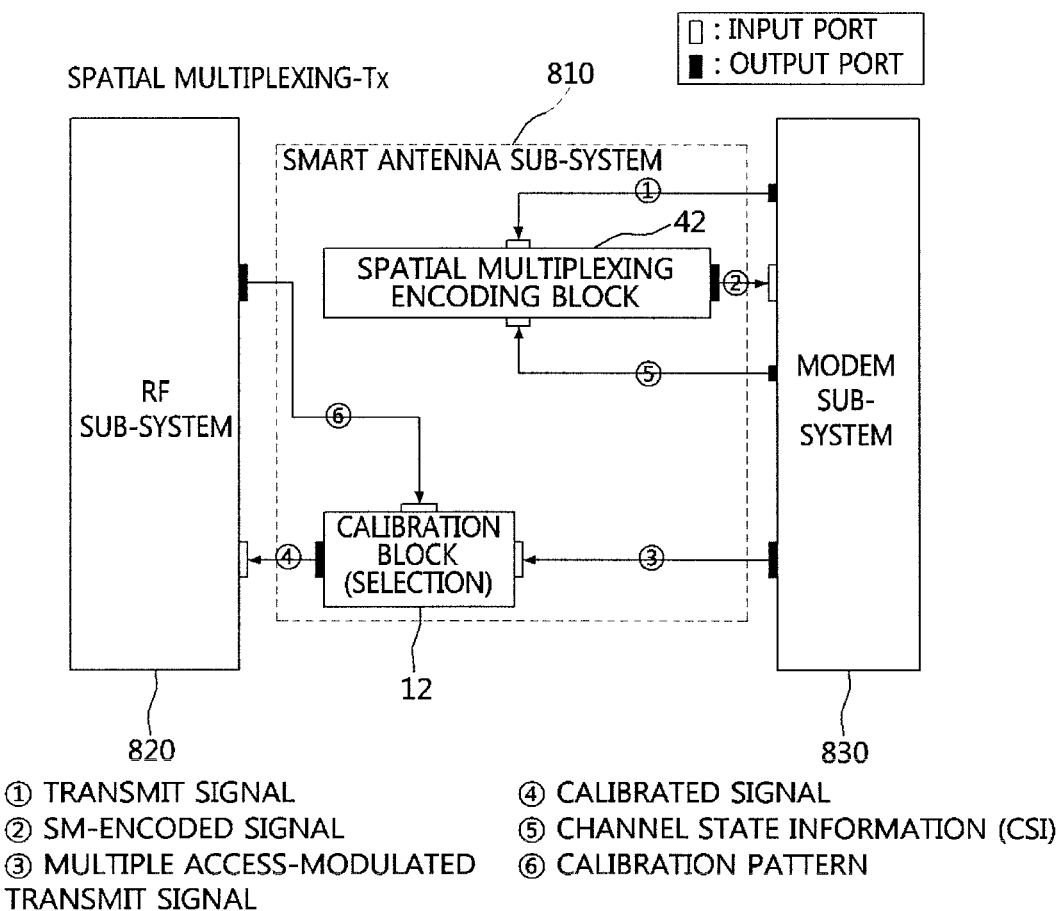
FIG. 9A is a block diagram illustrating function blocks performed to transmit a spatial multiplexing signal and a connection relationship between the function blocks in an SDR terminal device of an SDR multiple antenna system for a smart antenna algorithm according to an example embodiment of the present invention.

2) Operation of an SDR Multiple Antenna System for Transmitting a Spatial Multiplexing Signal FIG. 9A is a block diagram illustrating function blocks performed to transmit a spatial multiplexing signal and a connection relationship between the function blocks in an SDR terminal device of an SDR multiple antenna system for a smart antenna algorithm according to an example embodiment of the present invention.

Referring to FIG. 9A, the function blocks performed in the SDR terminal device of the SDR multiple antenna system for transmitting the spatial multiplexing signal may include a calibration block 12 and a spatial multiplexing encoding block 42.

Referring to FIG. 9A, the SDR multiple antenna system according to an example embodiment of the present invention includes a smart antenna sub-system 810. The smart antenna sub-system 810 may be operated in association with an RF sub-system 820 and a modem sub-system m830.

Referring to FIG. 9A, a configuration of each function block of the smart antenna sub-system 810 according to an example embodiment of the present invention is described below.

As described above, the calibration block 12 compensates for differences of phases and amplitudes caused by differences of characteristics of elements between antenna paths. Functions, port types, and operations of the calibration block 12 may be the same as described above in connection with the calibration block 11 and Table 1.

The spatial multiplexing encoding block 42 performs spatial multiplexing in a MIMO environment. The spatial multiplexing is one of methods for transmitting independently and individually encoded data signals with respective multiple transmitting antennas to increase throughput.

The spatial multiplexing encoding block 42 has a control port for representing a list of available spatial multiplexing schemes, determining a spatial multiplexing algorithm, and representing an index of a codebook predetermined for spatial multiplexing (SM) encoding, an input data port for receiving a transmit signal to be SM-encoded, an output data port for outputting an SM-encoded signal, and an input data port for receiving channel state information (CST) needed for SM encoding.

Types and operations of ports of the spatial multiplexing encoding block 42 are described in Table 5 below.

TABLE 5

| Port type | Operation |
| --- | --- |
| Control port (SpatialMultiplexing) | Represent a list of available spatial multiplexing schemes, determine a spatial multiplexing algorithm, and represent an index of a codebook predetermined for SM encoding |
| Input data port (DataIn) | Receive a transmit signal to be SM-encoded |
| Output data port (DataOut) | Provide an SM-encoded signal |
| Input data port (CSIIn) | Receive channel state information (CSI) needed for SM encoding |

The RF sub-system 820 serves to change a signal received from the smart antenna sub-system 810 to an analog signal, and increase a baseband signal to a carrier frequency. The modem sub-system 830 transfers a modulated signal and channel state information (CSI) to the smart antenna sub-system 810.

FIG. 9A is a block diagram illustrating function blocks performed to transmit a spatial multiplexing signal and a connection relationship between the function blocks in an SDR terminal device of an SDR multiple antenna system for a smart antenna algorithm according to an example embodiment of the present invention.

Figure 9B:
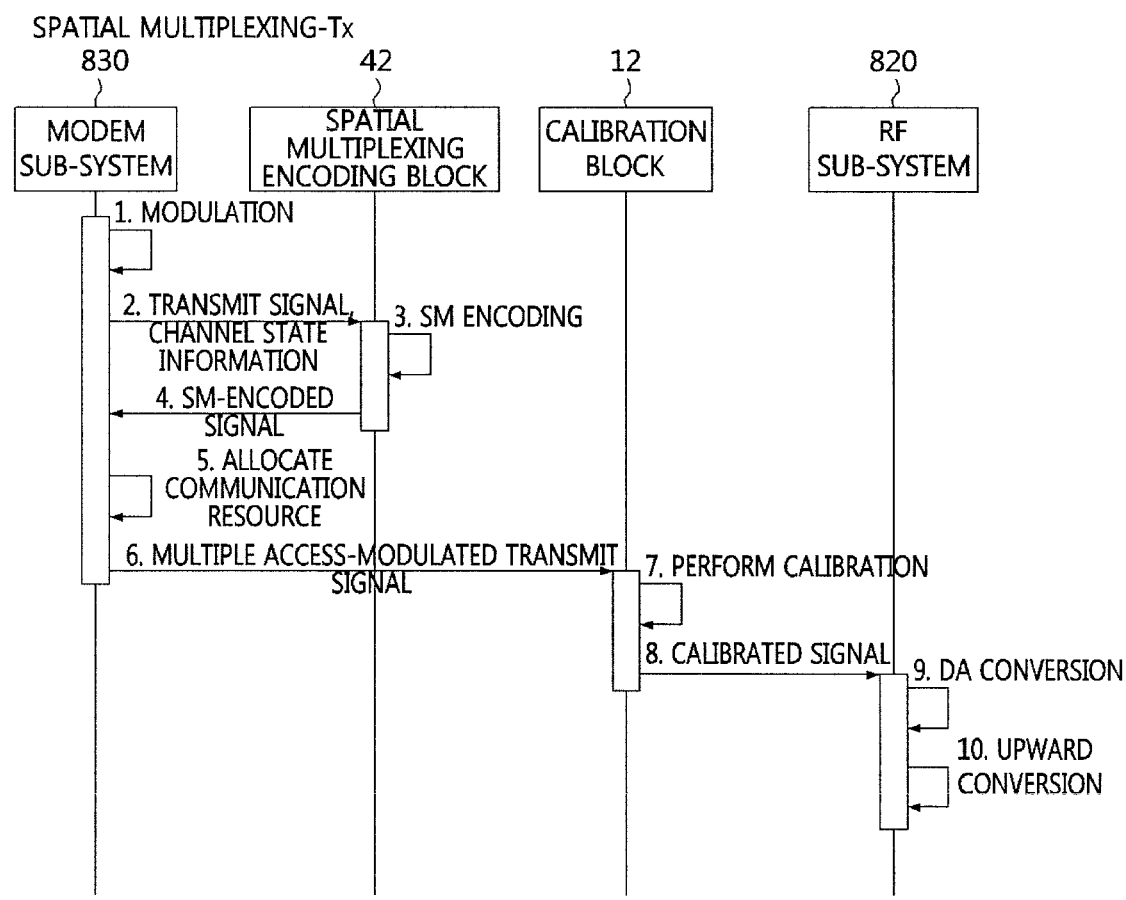
FIG. 9B is a sequence chart illustrating a signal flow and process between function blocks for transmitting a spatial multiplexing signal in an SDR terminal device of an SDR multiple antenna system for a smart antenna algorithm according to an example embodiment of the present invention.

FIG. 9B is a sequence chart illustrating a signal flow and process between function blocks for transmitting a spatial multiplexing signal in an SDR terminal device of an SDR multiple antenna system for a smart antenna algorithm according to an example embodiment of the present invention.

Referring to FIGS. 9A and 9B, operations of transmitting and processing a spatial multiplexing signal in an SDR terminal device for an SDR multiple antenna system according to the present invention are described below.

The modem sub-system 830 transfers a modulated transmit signal and channel state information (CSI) including channel information to the spatial multiplexing encoding block 42. The spatial multiplexing encoding block 42 performs SM encoding to a transmit signal using the channel state information (CSI), and transfers the SM-encoded signal to the modem sub-system 830.

When it is necessary to compensate for amplitude and phase differences of a multiple access (MA)-modulated transmit signal that has passed through the modem sub-system 830, the signal is transferred to the calibration block 12 in order to be calibrated. In this case, the amplitude and phase differences may be measured by transmitting a calibration pattern from the RF sub-system 820 to the calibration block 12 and receiving the calibration pattern. A calibrated signal, the amplitude and phase differences of which are compensated for, is transferred to the RF sub-system 820.

When the calibration for the MA-modulated transmit signal is not necessary, the MA-modulated transmit signal is directly transferred from the modem sub-system 830 to the RF sub-system 820 in order to be changed to an analog signal and upward converted to a carrier frequency.

Figure 10A:
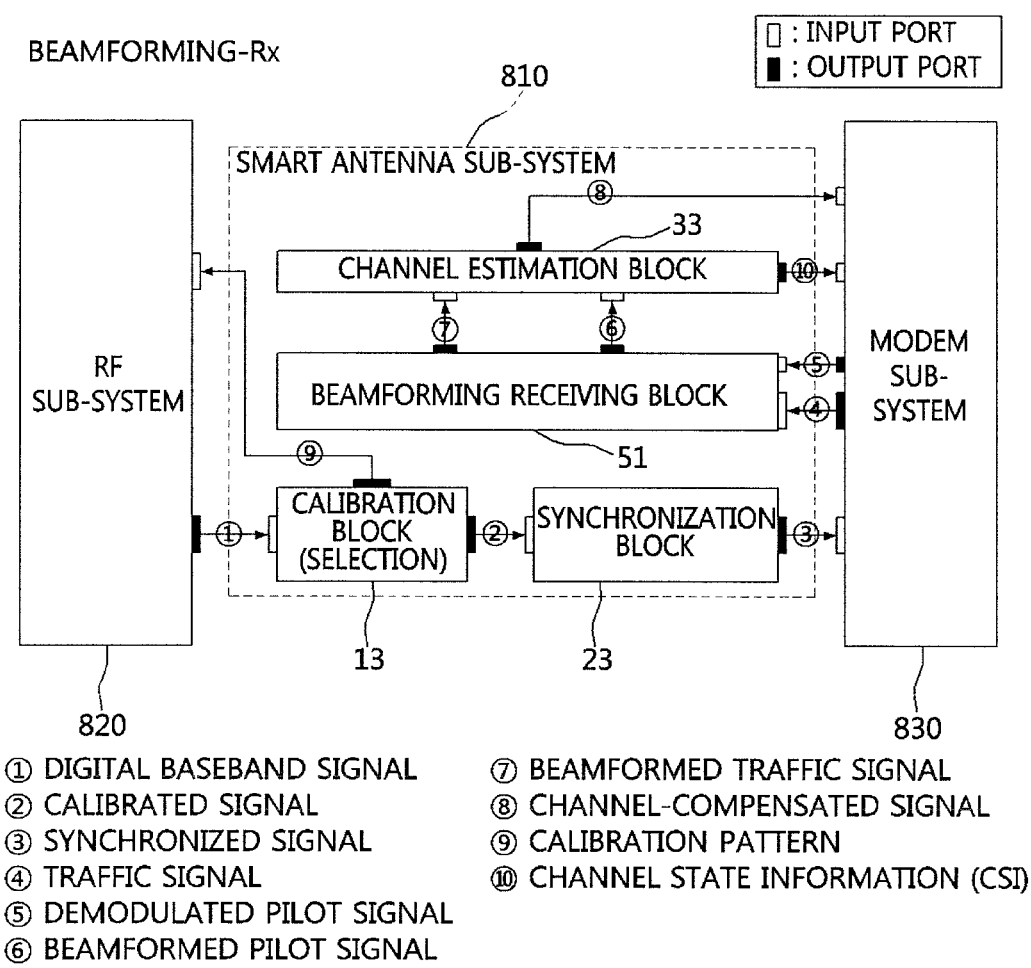
FIG. 10A is a block diagram illustrating function blocks performed to receive a beamforming signal and a connection relationship between the function blocks in an SDR terminal device of an SDR multiple antenna system for a smart antenna algorithm according to an example embodiment of the present invention.

3) Operation of an SDR Multiple Antenna System for Receiving a Beamforming Signal FIG. 10A is a block diagram illustrating function blocks performed to receive a beamforming signal and a connection relationship between the function blocks in an SDR terminal device of an SDR multiple antenna system for a smart antenna algorithm according to an example embodiment of the present invention.

Referring to FIG. 10A, the function blocks performed in the SDR terminal device of the SDR multiple antenna system for receiving the beamforming signal may include a calibration block 13, a synchronization block 23, a channel estimation block 33, and a beamforming receiving block 51.

Referring to FIG. 10A, the SDR multiple antenna system according to an example embodiment of the present invention includes a smart antenna sub-system 810. The smart antenna sub-system 810 is operated in association with an RF sub-system 820 and a modem sub-system m830.

Referring to FIG. 10A, a configuration of each function block of the smart antenna sub-system 810 according to an example embodiment of the present invention is described below.

The calibration block 13 compensates for differences of phases and amplitudes caused by differences of characteristics of elements between antenna paths. Functions, port types, and operations of the calibration block 13 may be the same as described above in connection with the calibration block 11 and Table 1.

The synchronization block 23 serves to synchronize symbols or frames before performing symbol demodulation, frame decoding, and a smart antenna algorithm. Functions, port types, and operations of the synchronization block 23 may be the same as described above in connection with the synchronization block 21 and Table 2.

The channel estimation block 33 serves to estimate a channel using a pilot signal or compensate for an influence of a channel on a traffic signal.

The channel estimation block 33 has a control port for setting a coherence time of a channel and setting a period for allocation for channel estimation, an input data port for receiving the demodulated pilot signal needed for channel estimation, an output data port for outputting the channel state information (CSI) including channel estimation information, an input data port for receiving a signal to be channel-compensated, and an output data port for outputting a channel-compensated signal.

Types and operations of ports of the channel estimation block 33 are described in Table 6 below.

TABLE 6

| Port type | Operation |
| --- | --- |
| Control port (ChannelEstimation) | Set a coherence time of a channel and set an allocation period for channel estimation |

TABLE 6-continued

| Port type | Operation |
| --- | --- |
| Input data port (PilotIn) | Receive a beamformed pilot signal needed for channel estimation |
| Output data port (CSIOut) | Provide channel state information (CSI) including channel estimation information |
| Output data port (DataOut) | Output a channel-compensated signal |
| Input data port (DataIn) | Input a signal to be channel-compensated |

The beamforming receiving block 51 operates to perform a beamforming algorithm at a transmitter (Tx) and a receiver (Rx). The beamforming algorithm is used to form a beam in a desired direction and form a null in a direction of an interference signal in order to calculate a weight.

The beamforming receiving block 51 has a control port for reading a beamforming weight vector for forming a beam in a desired direction, setting a direction of null beamforming, increasing a magnitude of a signal to obtain a desired gain in a desired direction, and setting a limitation of a side lobe, an input data port for receiving a traffic signal to be beamformed, an input data port for receiving a demodulated pilot signal to be beamformed, an output data port for outputting a beamformed traffic signal, and an output port for outputting a beamformed pilot signal.

Types and operations of ports of the beamforming receiving block 51 are described in Table 7 below.

TABLE 7

| Port type | Operation |
| --- | --- |
| Control port (Beamforming) | Obtain a beamforming weight vector for forming a beam in a desired direction, set a direction of null beamforming, increase a magnitude of a signal to obtain a desired gain in a desired direction, and set a limitation of a side lobe |
| Input data port (PilotIn) | Input a demodulated pilot signal to be beamformed |
| Input data port (DataIn) | Input a traffic signal to be beamformed |
| Output data port (PilotOut) | Output a beamformed pilot signal (combined_pilot_signal) |
| Output data port (DataOut) | Output a beamformed traffic signal (combined_signal) |

The RF sub-system 820 operated in association with the smart antenna sub-system 810 serves to decrease a signal input in a carrier frequency to a baseband frequency, change an analog signal to a digital signal, and transfer the digital signal to the smart antenna sub-system 810. The modern sub-system 830 serves to extract a signal of a user received from the smart antenna sub-system 810 and demodulate the signal.

FIG. 10A is a block diagram illustrating function blocks performed to receive a beamforming signal and a connection relationship between the function blocks in an SDR terminal device of an SDR multiple antenna system for a smart antenna algorithm according to an example embodiment of the present invention.

Figure 10B:
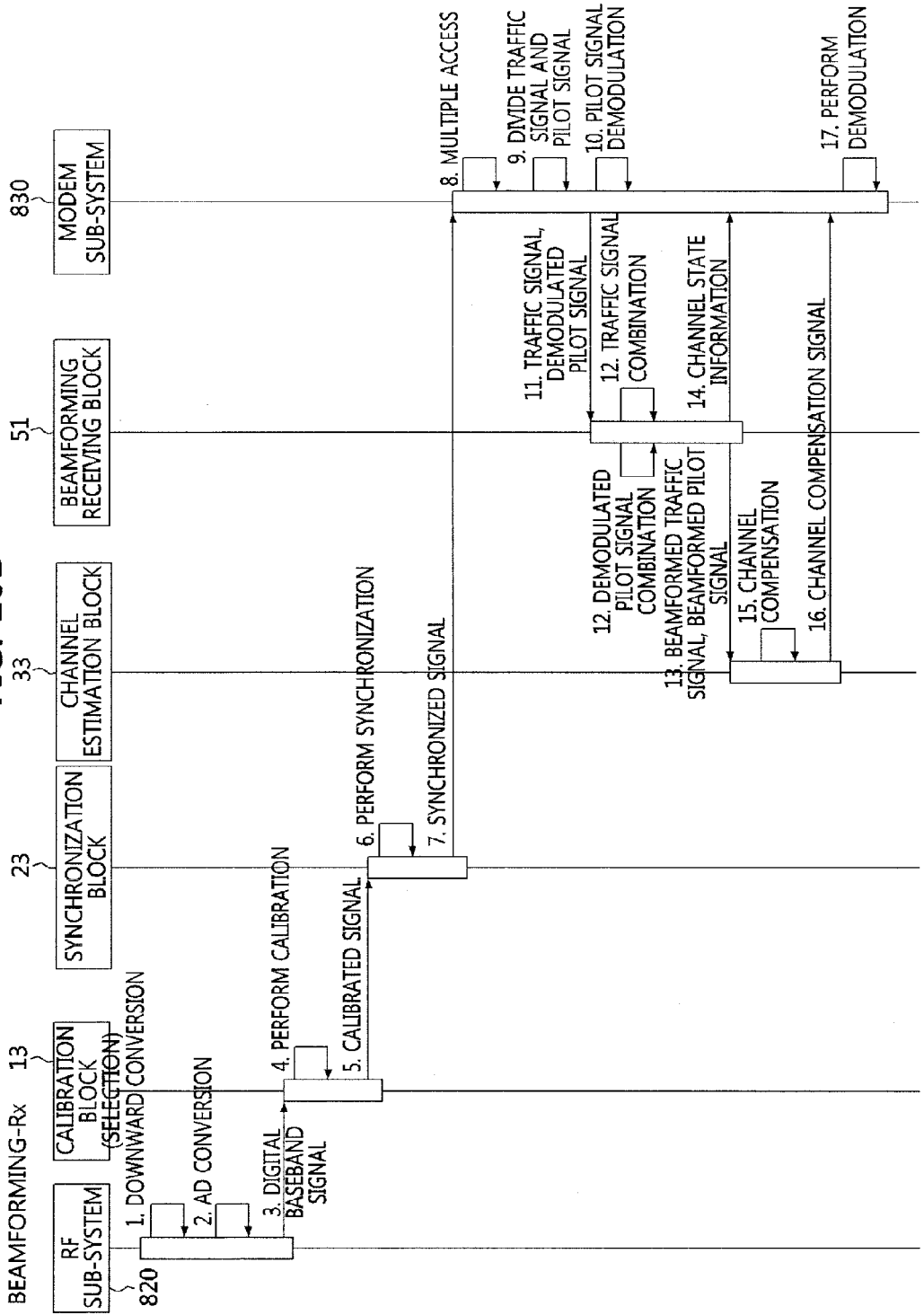
FIG. 10B is a sequence chart illustrating a signal flow and process between function blocks for receiving a beamforming signal in an SDR terminal device of an SDR multiple antenna system for a smart antenna algorithm according to an example embodiment of the present invention.

FIG. 10B is a sequence chart illustrating a signal flow and process between function blocks for receiving a beamforming signal in an SDR terminal device of an SDR multiple antenna system for a smart antenna algorithm according to an example embodiment of the present invention.

Referring to FIGS. 10A and 10B, operations of receiving and processing a beamforming signal in an SDR terminal device of an SDR multiple antenna system for a smart antenna algorithm according to an example embodiment of the present invention are described below.

A signal input through an antenna is changed to a baseband signal via the RF sub-system 820 and is changed from an analog signal to a digital signal. When it is necessary to compensate for amplitude and phase differences caused by differences of characteristics of elements between antenna paths, for the signal, the calibration block 13 receives the digital baseband signal from the RF sub-system 820 and performs calibration. In this case, the amplitude and phase differences may be measured by transmitting a calibration pattern from the calibration block 13 to the RF sub-system and receiving the calibration pattern.

The calibrated signal, the amplitude and phase differences of which have been compensated for, is transferred to the synchronization block 23 to perform time and frequency synchronization. When calibration is not performed in the calibration block 13, the synchronization block 23 directly receives the digital baseband signal from an A/D conversion unit to perform synchronization, and the synchronized signal is divided into a traffic signal and a demodulated pilot signal via the modem sub-system 830 and then transferred to the beamforming receiving block 51. The beamforming receiving block 51 multiplies the traffic signal and the demodulated pilot signal by a weight obtained by applying a beamforming algorithm to be combined therewith. The beamformed traffic signal (combined_signal) and the beamformed pilot signal (combined_pilot_signal) are transferred to the channel estimation block 33.

The channel estimation block 33 estimates a channel using the beamformed pilot signal, and then channel-compensates for the beamformed traffic signal using channel information. The channel-compensated signal and estimated channel state information (CSI) are transferred to the modem sub-system 830. In the modem sub-system 830, demodulation is performed on the channel-compensated signal so that symbol information is demodulated to bit information.

Figure 11A:
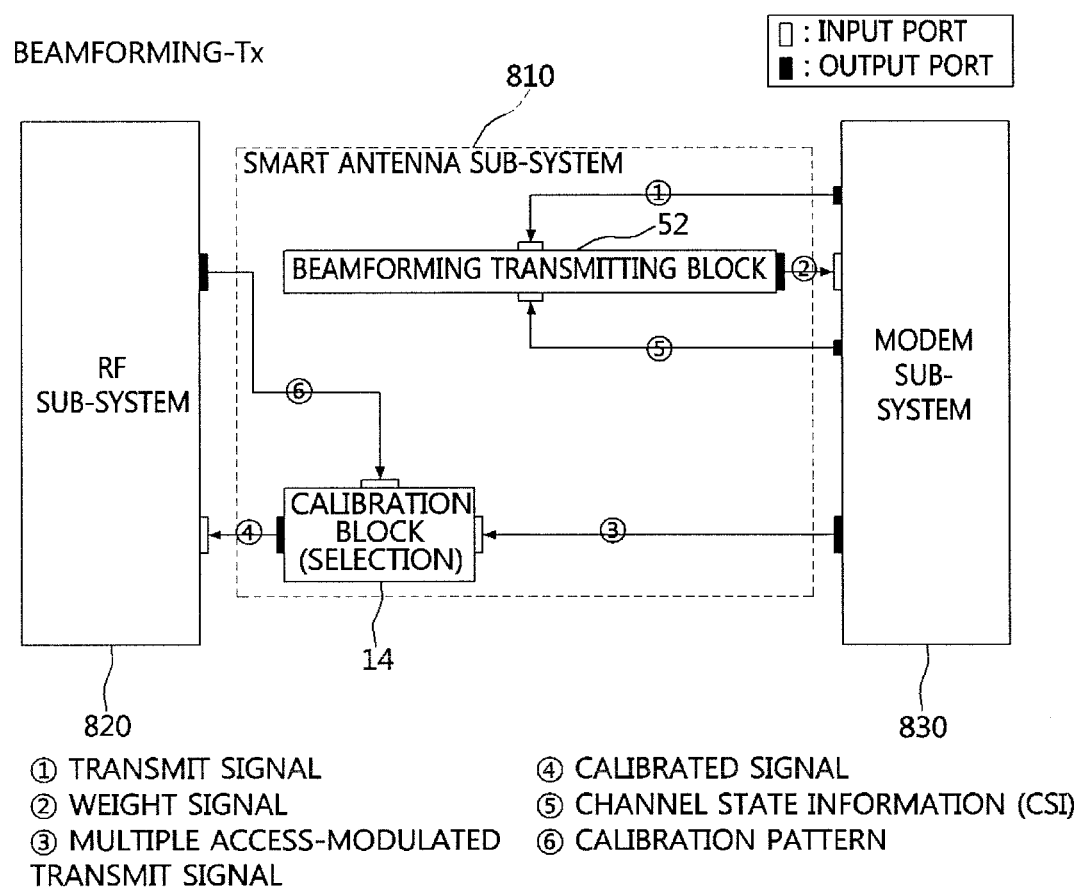
FIG. 11A is a block diagram illustrating function blocks performed to transmit a beamforming signal and a connection relationship between the function blocks in an SDR terminal device of an SDR multiple antenna system for a smart antenna algorithm according to an example embodiment of the present invention.

4) Operation of an SDR Multiple Antenna System for Transmitting a Beamforming Signal FIG. 11A is a block diagram illustrating function blocks performed to transmit a beamforming signal and a connection relationship between the function blocks in an SDR terminal device of an SDR multiple antenna system for a smart antenna algorithm according to an example embodiment of the present invention.

Referring to FIG. 11A, the function blocks performed in the SDR terminal device of the SDR multiple antenna system for transmitting the beamforming signal may include a calibration block 14 and a beamforming transmitting block 52.

Referring to FIG. 11A, the SDR multiple antenna system according to an example embodiment of the present invention includes a smart antenna sub-system 810. The smart antenna sub-system 810 may be operated in association with an RF sub-system 820 and a modem sub-system m830.

Referring to FIG. 11A, a configuration of each function block of the smart antenna sub-system 810 according to an example embodiment of the present invention is described below.

As described above, the calibration block 14 compensates for differences of phases and amplitudes caused by differences of characteristics of elements between antenna paths. Functions, port types, and operations of the calibration block 14 may be the same as described above in connection with the calibration block 11 and Table 1.

The beamforming transmitting block 52 operates to perform a beamforming algorithm at a transmitter (Tx) and a receiver (Rx). The beamforming algorithm is used to form a beam in a desired direction and form a null in a direction of an interference signal in order to calculate a weight.

The beamforming transmitting block 52 has a control port for reading a beamforming weight vector for forming a beam in a desired direction, setting a direction of null beamforming, increasing a magnitude of a signal to obtain a desired gain in a desired direction, and setting a limitation of a side lobe, an input data port for receiving channel state information (CSI) needed for beamforming, an input data port for receiving a signal to be beamformed, and an output data port for outputting a beamformed signal.

Types and operations of ports of the beamforming transmitting block 52 are described in Table 8 below.

TABLE 8

| Port type | Operation |
| --- | --- |
| Control port (Beamforming) | Obtain a beamforming weight vector for forming a beam in a desired direction, set a direction of null beamforming, increase a magnitude of a signal to obtain a desired gain in a desired direction, and set a limitation of a side lobe |
| Input data port (DataIn) | Input a signal to be beamformed |
| Output data port (DataOut) | Output a beamformed signal |
| Input data port (CSIIn) | Input channel state information (CSI) needed for beamforming |

The RF sub-system 820 serves to change a signal received from the smart antenna sub-system 810 to an analog signal, and increase a baseband signal to a carrier frequency. The modem sub-system 830 transfers a modulated signal and channel state information (CSI) to the smart antenna sub-system 810.

FIG. 11A is a block diagram illustrating function blocks performed to transmit a beamforming signal and a connection relationship between the function blocks in an SDR terminal device of an SDR multiple antenna system for a smart antenna algorithm according to an example embodiment of the present invention.

Figure 11B:
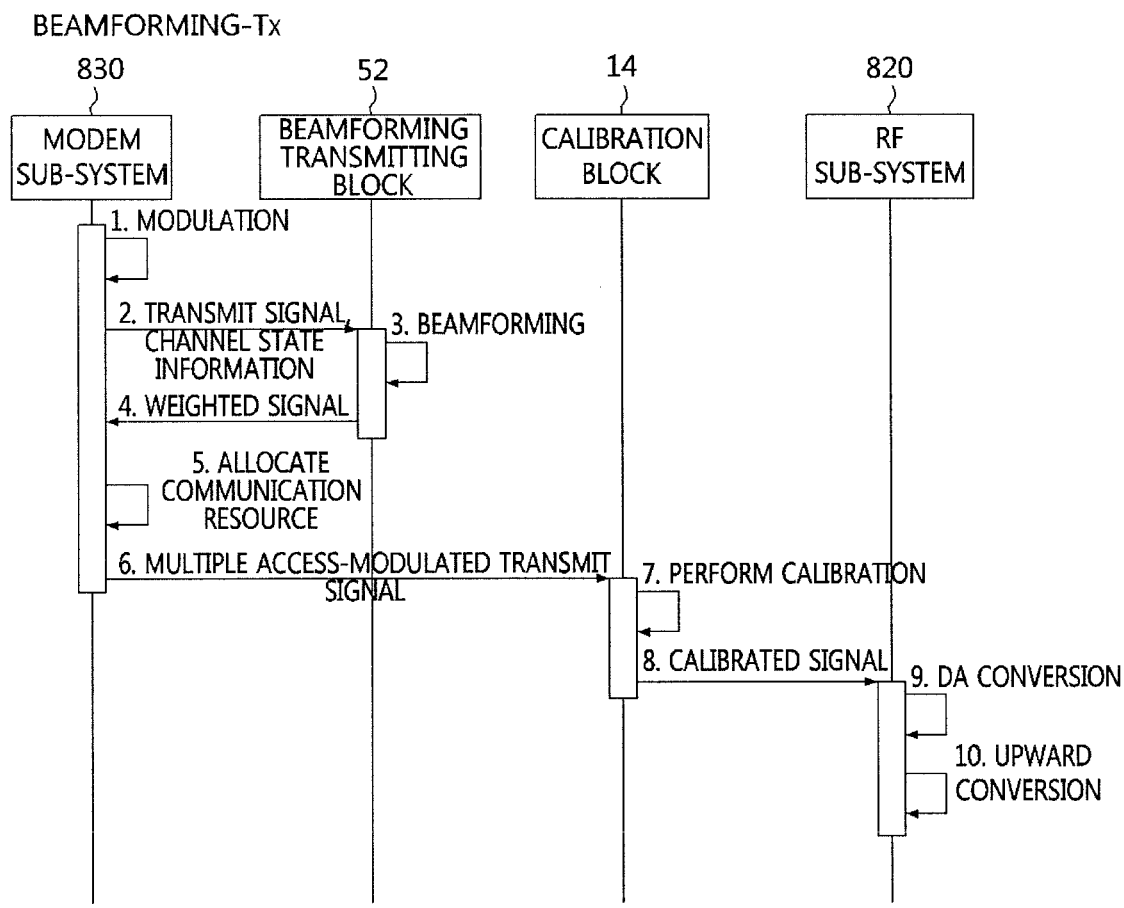
FIG. 11B is a sequence chart illustrating a signal flow and process between function blocks for transmitting a beamforming signal in an SDR terminal device of an SDR multiple antenna system for a smart antenna algorithm according to an example embodiment of the present invention.

FIG. 11B is a sequence chart illustrating a signal flow and process between function blocks for transmitting a beamforming signal in an SDR terminal device of an SDR multiple antenna system for a smart antenna algorithm according to an example embodiment of the present invention.

Referring to FIGS. 11A and 11B, operations of transmitting and processing a beamforming signal in an SDR terminal device for an SDR multiple antenna system according to the present invention are described below.

The modem sub-system 830 transfers a modulated transmit signal and channel state information (CSI) including channel information to the beamforming transmitting block 52. The beamforming transmitting block 52 performs beamforming on the transmit signal using the channel state information (CSI), and transfers a beamformed weighted signal to the modem sub-system 830.

When it is necessary to compensate for amplitude and phase differences of a multiple access modulated transmit signal that has passed through the modem sub-system 830, the signal is transferred to the calibration block 14 in order to be calibrated. In this case, the amplitude and phase differences may be measured by transmitting a calibration pattern from the RF sub-system to the calibration block 14 and receiving the calibration pattern. The calibrated signal, the amplitude and phase differences of which are compensated for, is transferred to the RF sub-system 820.

When the calibration for the multiple access modulated transmit signal is not necessary, the multiple access modulated transmit signal is directly transferred from the modem sub-system 830 to the RF sub-system 820 in order to be changed to an analog signal and upward converted to a carrier frequency.

Figure 12A:
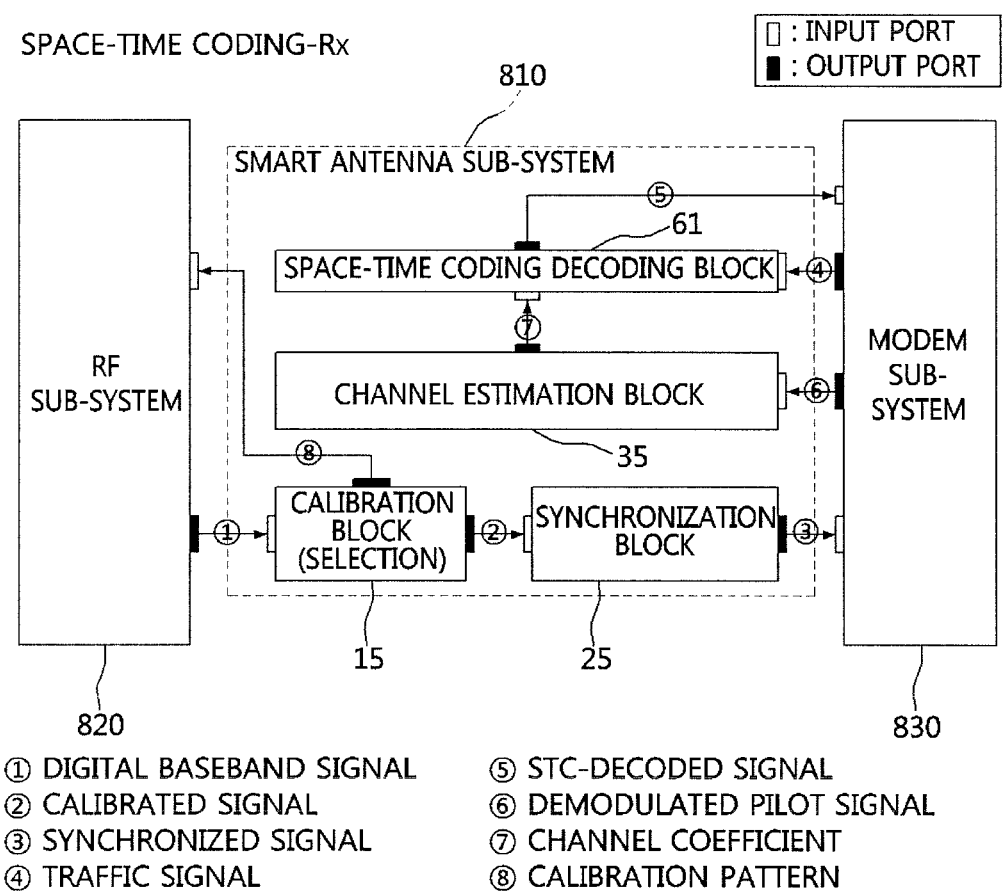
FIG. 12A is a block diagram illustrating function blocks performed to receive a space-time coding signal and a connection relationship between the function blocks in an SDR terminal device of an SDR multiple antenna system for a smart antenna algorithm according to an example embodiment of the present invention.

5) Operation of an SDR Multiple Antenna System for Receiving a Space-Time Coding Signal FIG. 12A is a block diagram illustrating function blocks performed to receive a space-time coding signal and a connection relationship between the function blocks in an SDR terminal device of an SDR multiple antenna system for a smart antenna algorithm according to an example embodiment of the present invention.

Referring to FIG. 12A, the function blocks performed in the SDR terminal device of the SDR multiple antenna system for receiving the space-time coding signal may include a calibration block 15, a synchronization block 25, a channel estimation block 35, and a space-time coding decoding block 61.

Referring to FIG. 12A, the SDR multiple antenna system according to an example embodiment of the present invention includes a smart antenna sub-system 810 that is operated in association with an RF sub-system 820 and a modem sub-system 830. Here, the RF sub-system 820 and the modem sub-system 830 operated in association with the smart antenna sub-system 810 may have various configurations without being limited to specific configurations.

Referring to FIG. 12A, a configuration of each function block of the smart antenna sub-system 810 according to an example embodiment of the present invention is described below.

The calibration block 15 compensates for differences of phases and amplitudes caused by differences of characteristics of elements between antenna paths. Functions, port types, and operations of the calibration block 15 may be the same as described above in connection with the calibration block 11 and Table 1.

The synchronization block 25 serves to synchronize symbols or frames before performing symbol demodulation, frame decoding, and smart antenna algorithm. Functions, port types, and operations of the synchronization block 25 may be the same as described above in connection with the synchronization block 21 and Table 2.

The channel estimation block 35 serves to estimate a channel using a pilot signal or compensate for an influence of a channel on a traffic signal.

The channel estimation block 35 has a control port for setting a coherence time of a channel and setting a period for allocation for channel estimation, an input data port for receiving a demodulated pilot signal needed for channel estimation, an output data port for outputting channel state information (CSI) including channel estimation information, and an output data port for outputting estimated channel coefficients.

Here, the channel coefficients represent channel values corresponding to all subcarriers or all symbols estimated using the modulated pilot.

Types and operations of ports of the channel estimation block 35 are described in Table 9 below.

TABLE 9

| Port type | Operation |
| --- | --- |
| Control port (ChannelEstimation) | Set a coherence time of a channel and set an allocation period for channel estimation |
| Input data port (PilotIn) | Receive a demodulated pilot signal needed for channel estimation |
| Output data port (ChanCoeffOut) | Provide estimated channel coefficients |

The space-time coding block 61 operates to perform space-time coding (STC) demodulation in a MIMO environment. Through the SIC demodulation, a plurality of overlapping data of data streams which have gone through different channels are demodulated so as to obtain a diversity gain.

The space-time coding block 61 may have a control port for defining STC mapping, an input data port for receiving a traffic signal to be STC-decoded, an output data port for outputting an STC-decoded signal, and an input data port for receiving the channel coefficients needed for STC decoding.

Types and operations of ports of the space-time coding block 61 are described in Table 10 below.

TABLE 10

| Port type | Operation |
| --- | --- |
| Control port (SpaceTimeCoding) | Define STC mapping |
| Input data port (DataIn) | Receive a traffic signal to be STC-decoded |
| Output data port (DataOut) | Output an STC-decoded signal |
| Input data port (ChanCoeffIn) | Receive channel coefficients needed for STC decoding |

The RF sub-system 820 operated in association with the smart antenna sub-system 810 serves to decrease a signal input in a carrier frequency to a baseband frequency, change an analog signal to a digital signal, and transfer the digital signal to the smart antenna sub-system 810. The modem sub-system 830 serves to extract a signal of a user received from the smart antenna sub-system 810 and demodulate the signal.

FIG. 12A is a block diagram illustrating function blocks performed to receive a space-time coding signal and a connection relationship between the function blocks in an SDR terminal device of an SDR multiple antenna system for a smart antenna algorithm according to an example embodiment of the present invention.

Figure 12B:
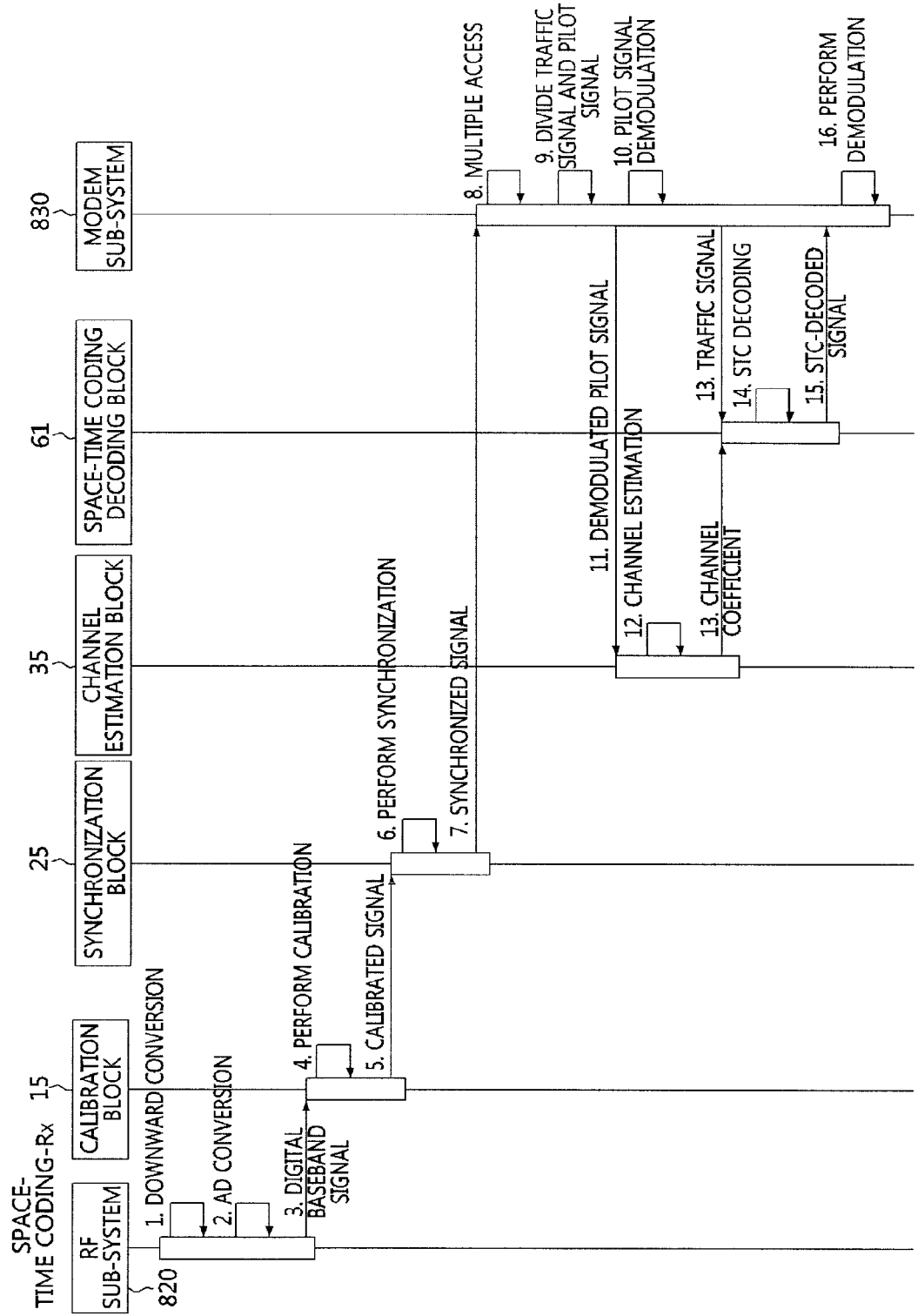
FIG. 12B is a sequence chart illustrating a signal flow and process between function blocks for receiving a space-time coding signal in an SDR terminal device of an SDR multiple antenna system for a smart antenna algorithm according to an example embodiment of the present invention.

FIG. 12B is a sequence chart illustrating a signal flow and process between function blocks for receiving a space-time coding signal in an SDR terminal device of an SDR multiple antenna system for a smart antenna algorithm according to an example embodiment of the present invention.

Referring to FIGS. 12A and 12B, operations of transmitting and processing a space-time coding signal in an SDR terminal device for an SDR multiple antenna system according to the present invention are described below.

A signal input through an antenna is changed to a baseband signal via the RF sub-system 820 and is changed from an analog signal to a digital signal. When it is necessary to compensate for amplitude and phase differences caused by differences of characteristics of elements between antenna paths, for the signal, the calibration block 15 receives the digital baseband signal from the RF sub-system 820 and performs calibration. In this case, the amplitude and phase differences may be measured by transmitting a calibration pattern from the calibration block 15 to the RF sub-system and receiving the calibration pattern.

The calibrated signal, the amplitude and phase differences of which have been compensated for, is transferred to the synchronization block 25 to perform time and frequency synchronization. When calibration is not performed in the calibration block 15, the synchronization block 25 directly receives the digital baseband signal from an A/D conversion unit to perform synchronization, and the synchronized signal is transferred to the modem sub-system 830 in order to be divided into a traffic signal and a demodulated pilot signal.

The traffic signal is transferred to the space-time coding decoding block 61, and the pilot signal is demodulated and then transferred to the channel estimation block 35. In the channel estimation block 35, channel estimation is performed using the demodulated pilot signal, and a result of the channel estimation, i.e., channel coefficients, is transferred to the space-time coding unit. In the space-time coding decoding block 61, STC decoding is performed using the traffic signal and the channel coefficients. A result of the STC decoding, i.e., an STC-decoded signal, is transferred to the modem sub-system 830 and is demodulated so that symbol information is demodulated to bit information.

Figure 13A:
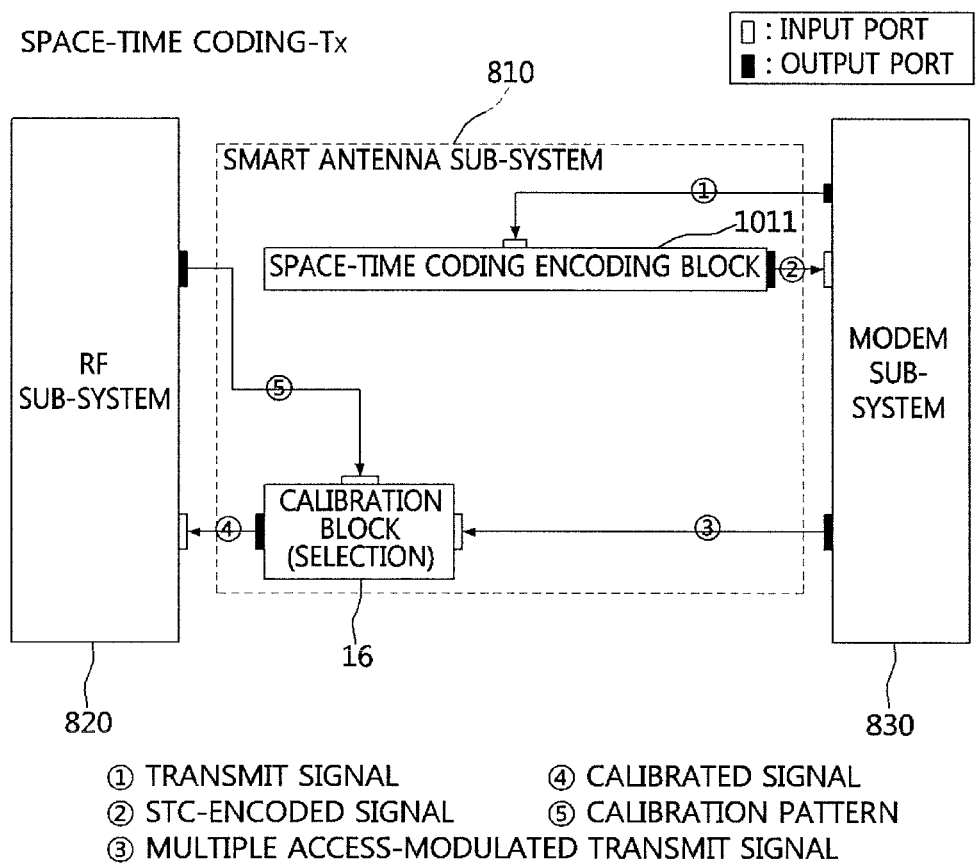
FIG. 13A is a block diagram illustrating function blocks performed to transmit a space-time coding signal and a connection relationship between the function blocks in an SDR terminal device of an SDR multiple antenna system for a smart antenna algorithm according to an example embodiment of the present invention.

6) Operation of an SDR Multiple Antenna System for Transmitting a Space-Time Coding Signal FIG. 13A is a block diagram illustrating function blocks performed to transmit a space-time coding signal and a connection relationship between the function blocks in an SDR terminal device of an SDR multiple antenna system for a smart antenna algorithm according to an example embodiment of the present invention.

Referring to FIG. 13A, the function blocks performed in the SDR terminal device of the SDR multiple antenna system for transmitting the space-time coding signal may include a calibration block 16 and a space-time coding encoding block 62.

Referring to FIG. 13A, the SDR multiple antenna system according to an example embodiment of the present invention includes a smart antenna sub-system 810 that is operated in association with an RF sub-system 820 and a modem sub-system 830. Here, the RF sub-system 820 and the modem sub-system 830 operated in association with the smart antenna sub-system 810 may have various configurations without being limited to specific configurations.

Referring to FIG. 13A, a configuration of each function block of the smart antenna sub-system 810 according to an example embodiment of the present invention is described below.

The calibration block 16 compensates for differences of phases and amplitudes caused by differences of characteristics of elements between antenna paths. Functions, port types, and operations of the calibration block 16 may be the same as described above in connection with the calibration block 11 and Table 1.

The space-time coding encoding block 62 operates to perform space-time coding (STC) in a MIMO environment. The space-time coding is used to improve reliability of data transmission using multiple transmission antennas. That is, a plurality of overlapping data of data streams are simultaneously transmitted to obtain a diversity gain.

The space-time coding encoding block 62 has a control port for defining STC mapping, an input data port for receiving a transmit signal to be STC-encoded, and an output data port for outputting an STC-encoded signal.

Types and operations of ports of the space-time coding encoding block 62 are described in Table 11 below.

TABLE 11

| Port type | Operation |
| --- | --- |
| Control port (SpaceTimeCoding) | Define STC mapping |
| Input data port (DataIn) | Receive a transmit signal to be STC-encoded |
| Output data port (DataOut) | Output an STC-encoded signal |

The RF sub-system 820 serves to change a signal received from the smart antenna sub-system 810 to an analog signal, and increase a baseband signal to a carrier frequency. The modem sub-system 830 transfers a modulated signal and channel state information (CSI) to the smart antenna sub-system 810.

FIG. 13A is a block diagram illustrating function blocks performed to transmit a space-time coding signal and a connection relationship between the function blocks in an SDR terminal device of an SDR multiple antenna system for a smart antenna algorithm according to an example embodiment of the present invention.

Figure 13B:
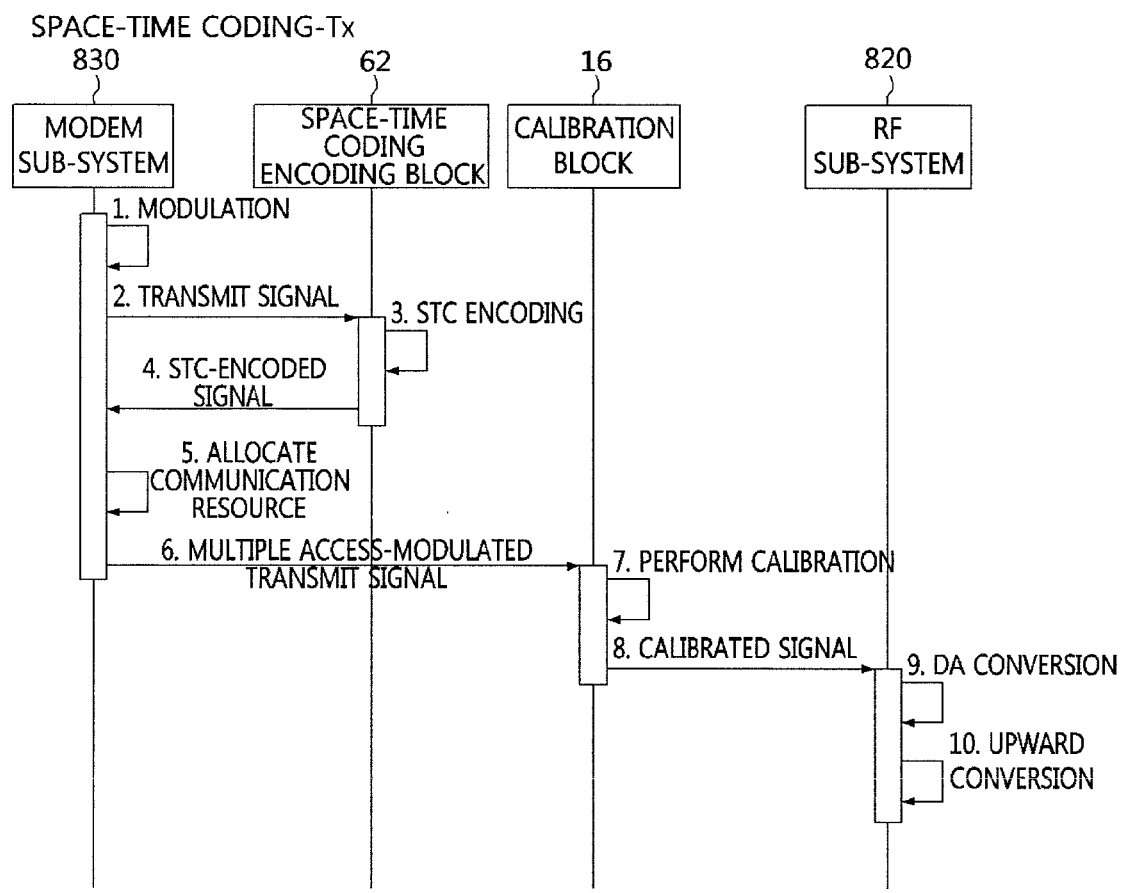
FIG. 13B is a sequence chart illustrating a signal flow and process between function blocks for transmitting a space-time coding signal in an SDR terminal device of an SDR multiple antenna system for a smart antenna algorithm according to an example embodiment of the present invention.

FIG. 13B is a sequence chart illustrating a signal flow and process between function blocks for transmitting a space-time coding signal in an SDR terminal device of an SDR multiple antenna system for a smart antenna algorithm according to an example embodiment of the present invention.

Referring to FIGS. 13A and 13B, operations of transmitting and processing a space-time coding signal in an SDR terminal device for an SDR multiple antenna system according to the present invention are described below.

The modem sub-system 830 modulates bit information to symbol data and transfers a result of the modulation, i.e., a transmit signal, to the space-time coding encoding block 62. The space-time coding encoding block 62 performs STC encoding on the transmit signal, and transfers a result of the STC encoding, i.e., an STC-encoded signal, to the modem sub-system 830.

When it is necessary to compensate for amplitude and phase differences of a multiple access-modulated transmit signal that has passed through the modem sub-system 830, the signal is transferred to the calibration block 16 in order to be calibrated. In this case, the amplitude and phase differences may be measured by transmitting a calibration pattern from the RF sub-system 820 to the calibration block 16 and receiving the calibration pattern. The calibrated signal, the amplitude and phase differences of which are compensated for, is transferred to the RF sub-system 820.

When the calibration for the multiple access-modulated transmit signal is not necessary, the multiple access-modulated transmit signal is directly transferred from the modem sub-system 830 to the RF sub-system 820. In the RF sub-system 820, the calibrated signal or multiple access-modulated transmit signal is changed from a digital signal to an analog signal, and the analog signal that is a baseband signal is loaded in a carrier frequency.

Figure 14A:
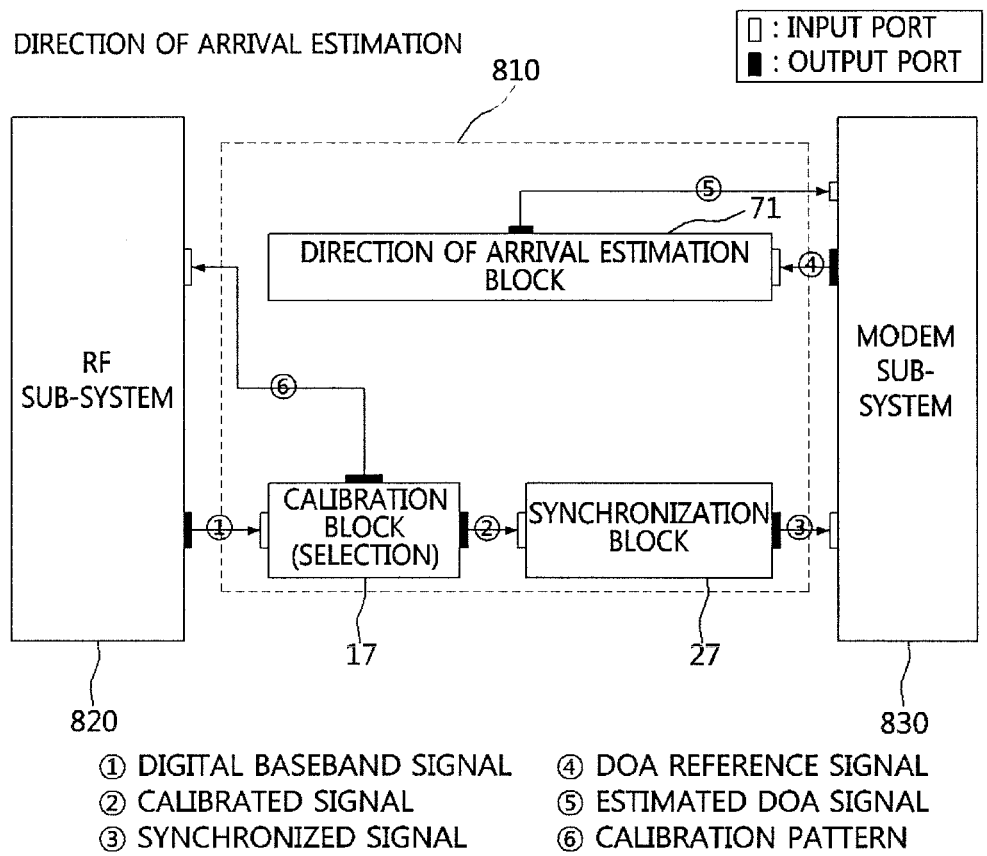
FIG. 14A is a block diagram illustrating function blocks performed to estimate a direction of arrival and a connection relationship between the function blocks in an SDR terminal device of an SDR multiple antenna system for a smart antenna algorithm according to an example embodiment of the present invention.

7) Operation of an SDR Multiple Antenna System for Estimating a Direction of Arrival FIG. 14A is a block diagram illustrating function blocks performed to estimate a direction of arrival and a connection relationship between the function blocks in an SDR terminal device of an SDR multiple antenna system for a smart antenna algorithm according to an example embodiment of the present invention.

Referring to FIG. 14A, the function blocks performed in the SDR terminal device of the SDR multiple antenna system for estimating a direction of arrival may include a calibration block 17, a synchronization block 27, and a direction of arrival estimation block 71.

Referring to FIG. 14A, the SDR multiple antenna system according to an example embodiment of the present invention includes a smart antenna sub-system 810 that is operated in association with an RF sub-system 820 and a modem sub-system 830. Here, the RF sub-system 820 and the modem sub-system 830 operated in association with the smart antenna sub-system 810 may have various configurations without being limited to specific configurations.

Referring to FIG. 14A, a configuration of each function block of the smart antenna sub-system 810 according to an example embodiment of the present invention is described below.

The calibration block 17 compensates for differences of phases and amplitudes caused by differences of characteristics of elements between antenna paths. Functions, port types, and operations of the calibration block 17 may be the same as described above in connection with the calibration block 11 and Table 1.

The synchronization block 27 serves to synchronize symbols or frames before performing symbol demodulation, frame decoding, and a smart antenna algorithm. Functions, port types, and operations of the synchronization block 27 may be the same as described above in connection with the synchronization block 21 and Table 2.

The direction of arrival estimation block 71 serves to estimate a transmission direction using all of target user signals or a pilot signal.

The direction of arrival estimation block 71 has a control port for reading an estimated direction of arrival, setting the number of estimated directions of arrival, setting a form of a signal for estimation, and representing quality of a direction of arrival, an input data port for receiving a DOA reference signal needed to estimate a direction of arrival, and an output data port for outputting information on an estimated direction of arrival.

Types and operations of ports of the direction of arrival estimation block 71 are described in Table 12 below.

TABLE 12

| Port type | Operation |
| --- | --- |
| Control port (DOAEstimation) | Obtain an estimated direction of arrival, set the number of estimated directions of arrival, set a form of a signal for estimation, and represent quality of a direction of arrival |
| Input data port (DataIn) | Input a DOA reference signal needed to estimate a direction of arrival |
| Output data port (DataOut) | Output information on an estimated direction of arrival |

The RF sub-system 820 serves to change a signal received from the smart antenna sub-system 810 to an analog signal, and increase a baseband signal to a carrier frequency. The modem sub-system 830 transfers a modulated signal and channel state information (CSI) to the smart antenna sub-system 810.

FIG. 14A is a block diagram illustrating function blocks performed to estimate a direction of arrival and a connection relationship between the function blocks in an SDR terminal device of an SDR multiple antenna system for a smart antenna algorithm according to an example embodiment of the present invention.

Figure 14B:
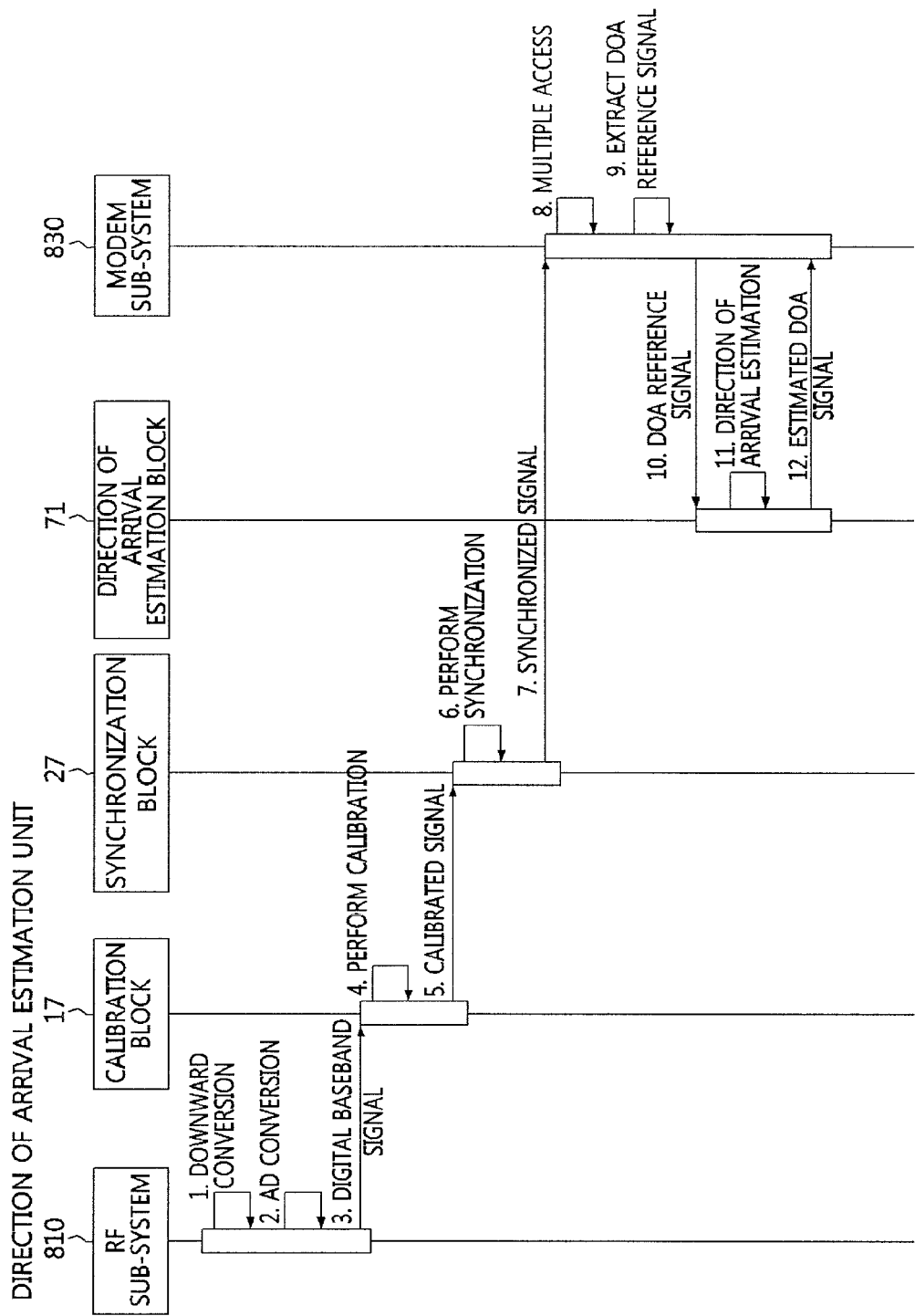
FIG. 14B is a sequence chart illustrating a signal flow and process between function blocks for estimating a direction of arrival in an SDR terminal device of an SDR multiple antenna system for a smart antenna algorithm according to an example embodiment of the present invention.

FIG. 14B is a sequence chart illustrating a signal flow and process between function blocks for estimating a direction of arrival in an SDR terminal device of an SDR multiple antenna system for a smart antenna algorithm according to an example embodiment of the present invention.

Referring to FIGS. 14A and 14B, a process of estimating a direction of arrival in an SDR terminal device for an SDR multiple antenna system according to the present invention is described below.

A signal input through an antenna is changed to a baseband signal in the RF sub-system 820, and the baseband signal is changed to a digital signal. When it is necessary to compensate for amplitude and phase differences caused by differences of characteristics of elements between antenna paths, for the signal, the calibration block 17 receives the digital baseband signal from the RF sub-system 820 and performs calibration. In this case, the amplitude and phase differences may be measured by transmitting a calibration pattern from the calibration block 17 to the RF sub-system 820.

The calibrated signal, the amplitude and phase differences of which have been compensated for, is transferred to the synchronization block 27 to perform time and frequency synchronization. When calibration is not performed in the calibration block 17, the synchronization block 27 directly receives the digital baseband signal from the RF sub-system 820 to perform synchronization. The synchronized signal is transferred to the modern sub-system 830.

The synchronized signal passes through the modem sub-system 830 and then is transferred to the direction of arrival estimation block 71 as a DOA reference signal. In the direction of arrival estimation block 71, a direction of arrival is estimated by obtaining a weight of the DOA reference signal. An estimated DOA signal is transferred to a channel state information storage unit.

While the example embodiments of the present invention and their advantages have been described in detail, it should be understood that various changes, substitutions and alterations may be made herein without departing from the scope of the invention.

The invention claimed is:

1. A software-defined radio (SDR) terminal device of a smart antenna SDR multiple antenna system, comprising a storage unit, a microprocessor, and at least one baseband accelerator,
    wherein the microprocessor is configured to read a code from the storage unit, execute the code, and load at least one function block for implementing at least one smart antenna algorithm from the storage unit to the baseband accelerator, the code comprising:
    a radio controller layer configured to transfer a control command for selecting a smart antenna algorithm and controlling the baseband accelerator according to the selected algorithm; and
    a baseband driver layer configured to receive the control command from the radio controller layer and transfer the received control command to the baseband accelerator,
    wherein the function block comprises blocks for implementing a spatial multiplexing signal processing algorithm, blocks for implementing a beamforming signal processing algorithm, blocks for implementing a space-time coding signal processing algorithm, blocks for implementing a direction of arrival estimation algorithm, and a control block for controlling operations and interfaces of the function blocks according to the smart antenna algorithm selected in the radio controller layer.

2. The SDR terminal device of claim 1, wherein the blocks for implementing the spatial multiplexing signal processing algorithm comprise:
    a synchronization block configured to perform synchronization of time and frequency for a received signal and output a synchronized signal;
    a channel estimation block configured to perform channel estimation for a received signal and output channel coefficients;
    a spatial multiplexing decoding block configured to output a signal obtained by performing spatial multiplexing decoding on a received signal using the channel coefficients;
    a spatial multiplexing encoding block configured to receive a signal to be transmitted and channel state information comprising channel information, and output a signal obtained by performing spatial multiplexing encoding on the signal to be transmitted using the channel state information; and
    a calibration block configured to compensate for amplitude and phase differences for a received signal and output a calibrated signal.

3. The SDR terminal device of claim 1, wherein the blocks for implementing the beamforming signal processing algorithm comprise:
    a synchronization block configured to perform synchronization of time and frequency for a received signal and output a synchronized signal;
    a channel estimation block configured to perform channel estimation for a received signal and output channel coefficients;
    a beam forming receiving processing block configured to output a signal to which a weight obtained by applying the beamforming signal processing algorithm to a received signal is applied;
    a beamforming transmitting processing block configured to receive a signal to be transmitted and channel state information comprising channel information, and output a signal to which a weight obtained by applying the beamforming signal processing algorithm to the signal to be transmitted using the channel state information is applied; and
    a calibration block configured to compensate for amplitude and phase differences for a received signal and output a calibrated signal.

4. The SDR terminal device of claim 1, wherein the blocks for implementing the space-time coding signal processing algorithm comprise:
    a synchronization block configured to perform synchronization of time and frequency for a received signal and output a synchronized signal;
    a channel estimation block configured to perform channel estimation for a received signal and output channel coefficients;
    a space-time coding decoding block configured to output a signal obtained by performing space-time coding decoding on a received signal using the channel coefficients;
    a space-time coding encoding block configured to receive a signal to be transmitted and output a signal obtained by performing space-time coding encoding on the signal to be transmitted; and
    a calibration block configured to compensate for amplitude and phase differences for a received signal and output a calibrated signal.

5. The SDR terminal device of claim 1, wherein the blocks for implementing the direction of arrival estimation algorithm comprise:
    a direction of arrival estimation block configured to receive a reference signal for estimating a direction of arrival, estimate the direction of arrival by obtaining a weight of the received reference signal, and output a signal of which the direction of arrival is estimated; and a synchronization block configured to perform synchronization of time and frequency for a received signal and output a synchronized signal.

6. The SDR terminal device of claim 1, wherein a type of each of the function blocks corresponds to one of a standard function block in which a standard command established on the basis of a predefined standard baseband interface is specified and a user-defined function block provided from an application provider and installed in the terminal device.

7. The SDR terminal device of claim 1, wherein the microprocessor receives pipeline configuration metadata and loads, from the storage unit, a loader for loading from the storage unit and rearranging the function blocks on the basis of the pipeline configuration metadata to perform the loader.

8. A method for distributing a software-defined radio (SDR) terminal application of a smart antenna SDR multiple antenna system, comprising:
    generating an application package comprising:
        a user-defined code for defining function blocks for implementing at least one smart antenna algorithm;
        a radio controller code for controlling the function blocks for implementing the at least one smart antenna algorithm and interfacing with an operating system of a terminal; and
        pipeline configuration metadata which defines an interconnection between the function blocks for implementing the at least one smart-antenna algorithm and initial values of attributes of the function blocks; and
    uploading the generated application package to an SDR terminal application distribution server,
    wherein the function blocks comprise blocks for implementing a spatial multiplexing signal processing algorithm, blocks for implementing a beamforming signal processing algorithm, blocks for implementing a space-time coding signal processing algorithm, blocks for implementing a direction of arrival estimation algorithm, and a control block for receiving a control command for the function blocks and controlling the function blocks.

9. The method of claim 8, wherein the blocks for implementing the spatial multiplexing signal processing algorithm comprise:
    a synchronization block configured to perform synchronization of time and frequency for a received signal and output a synchronized signal;
    a channel estimation block configured to perform channel estimation for a received signal and output channel coefficients;
    a spatial multiplexing decoding block configured to output a signal obtained by performing spatial multiplexing decoding on a received signal using the channel coefficients;
    a spatial multiplexing encoding block configured to receive a signal to be transmitted and channel state information comprising channel information, and output a signal obtained by performing spatial multiplexing encoding on the signal to be transmitted using the channel state information; and
    a calibration block configured to compensate for amplitude and phase differences for a received signal and output a calibrated signal.

10. The method of claim 8, wherein the blocks for implementing the beamforming signal processing algorithm comprise:

a synchronization block configured to perform synchronization of time and frequency for a received signal and output a synchronized signal;

a channel estimation block configured to perform channel estimation for a received signal and output channel coefficients;

a beamforming receiving processing block configured to output a signal to which a weight obtained by applying the beamforming signal processing algorithm to a received signal is applied;

a beamforming transmitting processing block configured to receive a signal to be transmitted and channel state information comprising channel information, and output a signal to which a weight obtained by applying the beamforming signal processing algorithm to the signal to be transmitted using the channel state information is applied; and a calibration block configured to compensate for amplitude and phase differences for a received signal and output a calibrated signal.

11. The method of claim 8, wherein the blocks for implementing the space-time coding signal processing algorithm comprise:
    a synchronization block configured to perform synchronization of time and frequency for a received signal and output a synchronized signal;
    a channel estimation block configured to perform channel estimation for a received signal and output channel coefficients;
    a space-time coding decoding block configured to output a signal obtained by performing space-time coding decoding on a received signal using the channel coefficients;
    a space-time coding encoding block configured to receive a signal to be transmitted and output a signal obtained by performing space-time coding encoding on the signal to be transmitted; and
    a calibration block configured to compensate for amplitude and phase differences for a received signal and output a calibrated signal.

12. The method of claim 8, wherein the blocks for implementing the direction of arrival estimation algorithm comprise:
    a direction of arrival estimation block configured to receive a reference signal for estimating a direction of arrival, estimate the direction of arrival by obtaining a weight of the received reference signal, and output a signal of which the direction of arrival is estimated; and
    a synchronization block configured to perform synchronization of time and frequency for a received signal and output a synchronized signal.

13. The method of claim 8, wherein the user-defined code is configured in a form of one of a code that is directly executable in a baseband accelerator of a terminal device in which the application package is installed, a source code that needs to be compiled in order to be executed, and intermediate representation.

14. A method for installing a software-defined radio (SDR) terminal application of a smart antenna SDR multiple antenna system, comprising:
    downloading, from an SDR terminal application distribution server, an application package comprising:
        a user-defined code for defining function blocks for implementing at least one smart antenna algorithm;

a radio controller code for controlling the function blocks for implementing the at least one smart antenna algorithm and interfacing with an operating system of a terminal; and pipeline configuration metadata which defines an interconnection between the function blocks for implementing the at least one smart-antenna algorithm and initial values of attributes of the function blocks; and storing the radio controller code and the user-defined code in a storage unit of the terminal with reference to the pipeline configuration metadata, wherein the function blocks comprise blocks for implementing a spatial multiplexing signal processing algorithm, blocks for implementing a beamforming signal processing algorithm, blocks for implementing a space-time coding signal processing algorithm, blocks for implementing a direction of arrival estimation algorithm, and a control block for receiving a control command for the function blocks and controlling the function blocks.

15. The method of claim 14, wherein the blocks for implementing the spatial multiplexing signal processing algorithm comprise:

a synchronization block configured to perform synchronization of time and frequency for a received signal and output a synchronized signal;

a channel estimation block configured to perform channel estimation for a received signal and output channel coefficients;

a spatial multiplexing decoding block configured to output a signal obtained by performing spatial multiplexing decoding on a received signal using the channel coefficients;

a spatial multiplexing encoding block configured to receive a signal to be transmitted and channel state information comprising channel information, and output a signal obtained by performing spatial multiplexing encoding on the signal to be transmitted using the channel state information; and a calibration block configured to compensate for amplitude and phase differences for a received signal and output a calibrated signal.

16. The method of claim 14, wherein the blocks for implementing the beamforming signal processing algorithm comprise:

a synchronization block configured to perform synchronization of time and frequency for a received signal and output a synchronized signal;

a channel estimation block configured to perform channel estimation for a received signal and output channel coefficients;

a beamforming receiving processing block configured to output a signal to which a weight obtained by applying the beamforming signal processing algorithm to a received signal is applied;

a beamforming transmitting processing block configured to receive a signal to be transmitted and channel state information comprising channel information, and output a signal to which a weight obtained by applying the beamforming signal processing algorithm to the signal to be transmitted using the channel state information is applied; and a calibration block configured to compensate for amplitude and phase differences for a received signal and output a calibrated signal.

17. The method of claim 14, wherein the blocks for implementing the space-time coding signal processing algorithm comprise:

a synchronization block configured to perform synchronization of time and frequency for a received signal and output a synchronized signal;

a channel estimation block configured to perform channel estimation for a received signal and output channel coefficients;

a space-time coding decoding block configured to output a signal obtained by performing space-time coding decoding on a received signal using the channel coefficients;

a space-time coding encoding block configured to receive a signal to be transmitted and output a signal obtained by performing space-time coding encoding on the signal to be transmitted; and a calibration block configured to compensate for amplitude and phase differences for a received signal and output a calibrated signal.

18. The method of claim 14, wherein the blocks for implementing the direction of arrival estimation algorithm comprise:

a direction of arrival estimation block configured to receive a reference signal for estimating a direction of arrival, estimate the direction of arrival by obtaining a weight of the received reference signal, and output a signal of which the direction of arrival is estimated; and a synchronization block configured to perform synchronization of time and frequency for a received signal and output a synchronized signal.

19. The method of claim 14, wherein, when the user-defined code is not directly executable in the baseband accelerator of the terminal, during the storing, the user-defined code is compiled so as to be executed in the baseband accelerator, and the compiled code is stored in the storage unit.

* * * * *